(12) United States Patent
Kakinoki et al.

(10) Patent No.: US 11,640,221 B2
(45) Date of Patent: May 2, 2023

(54) SENSOR DEVICE, INPUT DEVICE AND METHOD

(71) Applicant: Japan Display Inc., Tokyo (JP)

(72) Inventors: Yuto Kakinoki, Tokyo (JP); Naoki Takada, Tokyo (JP)

(73) Assignee: Japan Display Inc., Tokyo (JP)

( * ) Notice: Subject to any disclaimer, the term of this patent is extended or adjusted under 35 U.S.C. 154(b) by 29 days.

(21) Appl. No.: 17/522,102

(22) Filed: Nov. 9, 2021

(65) Prior Publication Data

US 2022/0066597 A1    Mar. 3, 2022

Related U.S. Application Data

(63) Continuation of application No. PCT/JP2020/006918, filed on Feb. 20, 2020.

(30) Foreign Application Priority Data

May 10, 2019  (JP) ............................. JP2019-090053

(51) Int. Cl.
*G06F 3/044*  (2006.01)
*G06F 3/02*   (2006.01)
(Continued)

(52) U.S. Cl.
CPC .............. *G06F 3/0446* (2019.05); *G06F 3/02* (2013.01); *G06F 3/0362* (2013.01); *G06F 3/046* (2013.01)

(58) Field of Classification Search
CPC ........ G06F 3/0446; G06F 3/02; G06F 3/0362; G06F 3/046; G06F 3/0393; G06F 3/04166; G06F 3/0445
See application file for complete search history.

(56) References Cited

U.S. PATENT DOCUMENTS 5,601,489 A * 2/1997 Komaki ................ G06F 3/0238
                                                                341/23
5,798,756 A * 8/1998 Yoshida .............. G06F 3/04184
                                                                178/20.02
(Continued)

FOREIGN PATENT DOCUMENTS

JP       2013-117846 A      6/2013
JP       2018-181099 A     11/2018
(Continued)

OTHER PUBLICATIONS

International Search Report issued in International Patent Application No. PCT/JP2020/006918 dated May 19, 2020 and English translation of same. 5 pages.

(Continued)

*Primary Examiner* — Benyam Ketema
(74) *Attorney, Agent, or Firm* — K&L Gates LLP

(57) ABSTRACT

According to one embodiment, a sensor device includes a touch panel, an input device configured such that a resonant circuit including first and second conductive materials, a magnetic field generation source disposed at a position overlapping the touch panel, and a sensor controller. Each of the first and second conductive materials is capacitively coupled to at least one of a plurality of electrodes included in the touch panel. The resonant circuit is electromagnetically coupled to the magnetic field generation source so as to resonate based on a magnetic field. The sensor controller detects positions of the first and second conductive materials on the touch panel by applying a voltage to each of the plurality of electrodes.

16 Claims, 32 Drawing Sheets

(51) Int. Cl.
*G06F 3/0362* (2013.01)
*G06F 3/046* (2006.01)

(56) References Cited

U.S. PATENT DOCUMENTS

| | | | | |
|---|---|---|---|---|
| 9,529,447 B2* | 12/2016 | Hodges | .................. | A63F 13/98 |
| 10,198,106 B2* | 2/2019 | Katsuta | .............. | G06F 3/04166 |
| 10,310,640 B2* | 6/2019 | Lee | .................... | G06F 3/03545 |
| 10,795,491 B2* | 10/2020 | Katsurahira | ........ | G06F 3/03545 |
| 11,513,639 B2* | 11/2022 | Kono | .................... | G06F 3/0412 |
| 11,513,649 B2* | 11/2022 | Takada | ................... | G06F 3/038 |
| 2004/0248621 A1* | 12/2004 | Schon | .............. | H04M 1/72466 |
| | | | | 455/566 |
| 2006/0256090 A1* | 11/2006 | Huppi | .................. | G06F 1/1616 |
| | | | | 345/173 |
| 2010/0066693 A1* | 3/2010 | Sato | ..................... | G06F 3/0446 |
| | | | | 345/173 |
| 2010/0265190 A1* | 10/2010 | Rofougaran | ........... | G06F 3/046 |
| | | | | 345/173 |
| 2010/0328240 A1* | 12/2010 | Matsubara | ........... | G06F 3/0445 |
| | | | | 345/173 |
| 2011/0090146 A1* | 4/2011 | Katsurahira | ........... | G06F 3/046 |
| | | | | 345/156 |
| 2012/0169597 A1* | 7/2012 | Liotta | .................. | G06F 3/0338 |
| | | | | 345/161 |
| 2012/0169663 A1* | 7/2012 | Kim | .................... | G06F 3/04883 |
| | | | | 345/173 |
| 2012/0306824 A1* | 12/2012 | Horie | .................... | G06F 3/046 |
| | | | | 345/179 |
| 2013/0141085 A1 | 6/2013 | Suzuki | | |
| 2013/0278554 A1* | 10/2013 | Ide | .......................... | G06F 3/044 |
| | | | | 345/174 |
| 2013/0328805 A1* | 12/2013 | Kim | ..................... | G06F 3/0488 |
| | | | | 345/173 |
| 2014/0078104 A1* | 3/2014 | Lee | ..................... | G06F 3/0446 |
| | | | | 345/174 |
| 2014/0354560 A1* | 12/2014 | Kim | ....................... | G06F 3/046 |
| | | | | 345/173 |
| 2015/0212634 A1* | 7/2015 | Pyun | .................. | H01L 27/1259 |
| | | | | 345/173 |
| 2015/0339021 A1 | 11/2015 | Duteil et al. | | |
| 2016/0109988 A1* | 4/2016 | Wang | ................. | G06F 3/03545 |
| | | | | 345/173 |
| 2016/0209957 A1* | 7/2016 | Jung | ....................... | G06F 3/017 |
| 2016/0224086 A1* | 8/2016 | Kim | ..................... | G06F 3/03545 |
| 2016/0306489 A1* | 10/2016 | Mizuhashi | .......... | G06F 3/04166 |
| 2017/0102815 A1* | 4/2017 | Portmann | ........... | H03K 17/962 |
| 2017/0108972 A1* | 4/2017 | Kurasawa | ............. | G06F 3/0412 |
| 2017/0111882 A1* | 4/2017 | Bang | ................... | H04W 68/005 |
| 2018/0018028 A1* | 1/2018 | Lee | ....................... | G06F 3/0383 |
| 2018/0052548 A1* | 2/2018 | Katsuta | .............. | G02F 1/13338 |
| 2018/0059461 A1* | 3/2018 | Katsuta | ............... | G06F 3/04164 |
| 2018/0307340 A1* | 10/2018 | Gotoh | ................ | G06F 3/04166 |
| 2018/0300009 A1 | 12/2018 | Kurasawa et al. | | |
| 2018/0373351 A1* | 12/2018 | Sawada | ................ | H01H 19/005 |
| 2019/0025944 A1* | 1/2019 | Konishi | ................ | G06F 3/016 |
| 2019/0379377 A1* | 12/2019 | Ju | .......................... | H03K 17/97 |
| 2020/0081557 A1* | 3/2020 | Togashi | ................ | G06F 3/0362 |
| 2020/0081576 A1* | 3/2020 | Takada | .................. | G06F 3/0446 |
| 2020/0235477 A1* | 7/2020 | Yamamoto | ............... | H01Q 1/22 |
| 2021/0109626 A1* | 4/2021 | Nishida | ................ | G06F 3/0425 |
| 2021/0141492 A1* | 5/2021 | Lee | ....................... | G06F 3/0446 |
| 2021/0173545 A1* | 6/2021 | Kurasawa | ............... | G02F 1/133 |
| 2022/0091697 A1* | 3/2022 | Miyagawa | ............ | G06F 3/0446 |
| 2022/0137722 A1* | 5/2022 | Hayashi | ................ | G06F 3/0362 |
| | | | | 345/174 |
| 2022/0137727 A1* | 5/2022 | Kono | .................. | G06F 3/04166 |
| | | | | 345/174 |
| 2022/0147189 A1* | 5/2022 | Kakinoki | ............. | G06F 3/0362 |
| 2022/0147191 A1* | 5/2022 | Kakinoki | ................ | G06F 3/044 |
| 2022/0342503 A1* | 10/2022 | Kakinoki | ............. | G06F 3/0446 |
| 2022/0342506 A1* | 10/2022 | Hayashi | ................ | G06F 1/1632 |
| 2022/0397999 A1* | 12/2022 | Hayashi | ................ | G06F 3/0446 |
| 2022/0413631 A1* | 12/2022 | Kakinoki | .............. | G06F 3/0362 |
| 2023/0025138 A1* | 1/2023 | Lim | ....................... | G06F 3/0412 |

FOREIGN PATENT DOCUMENTS

| | | |
|---|---|---|
| JP | 2019-067300 A | 4/2019 |
| WO | WO2017/094234 A1 | 6/2017 |

OTHER PUBLICATIONS

Written Opinion issued in International Patent Application No. PCT/JP2020/006918 dated May 19, 2020. 3 pages.

* cited by examiner

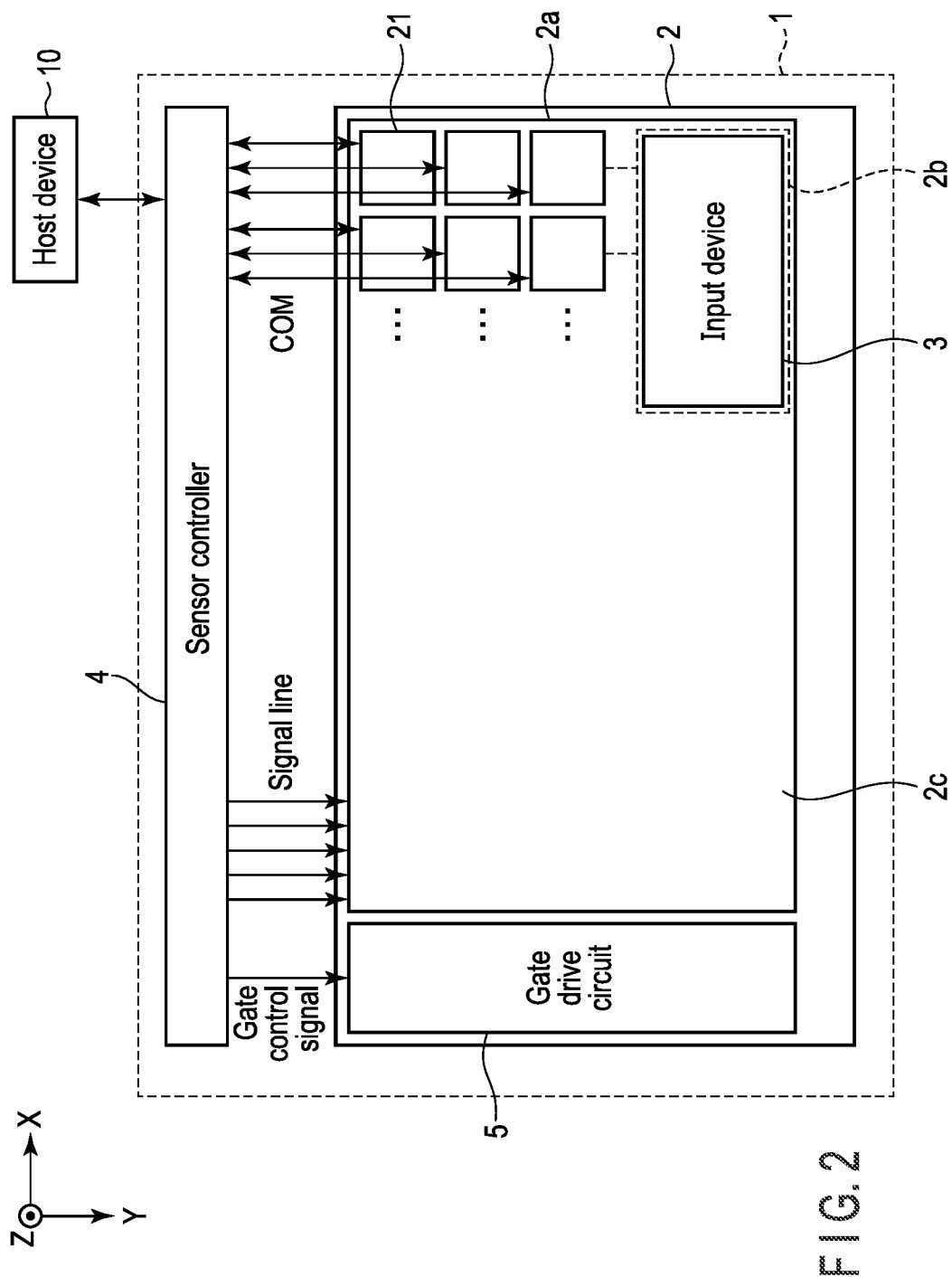
F I G. 2

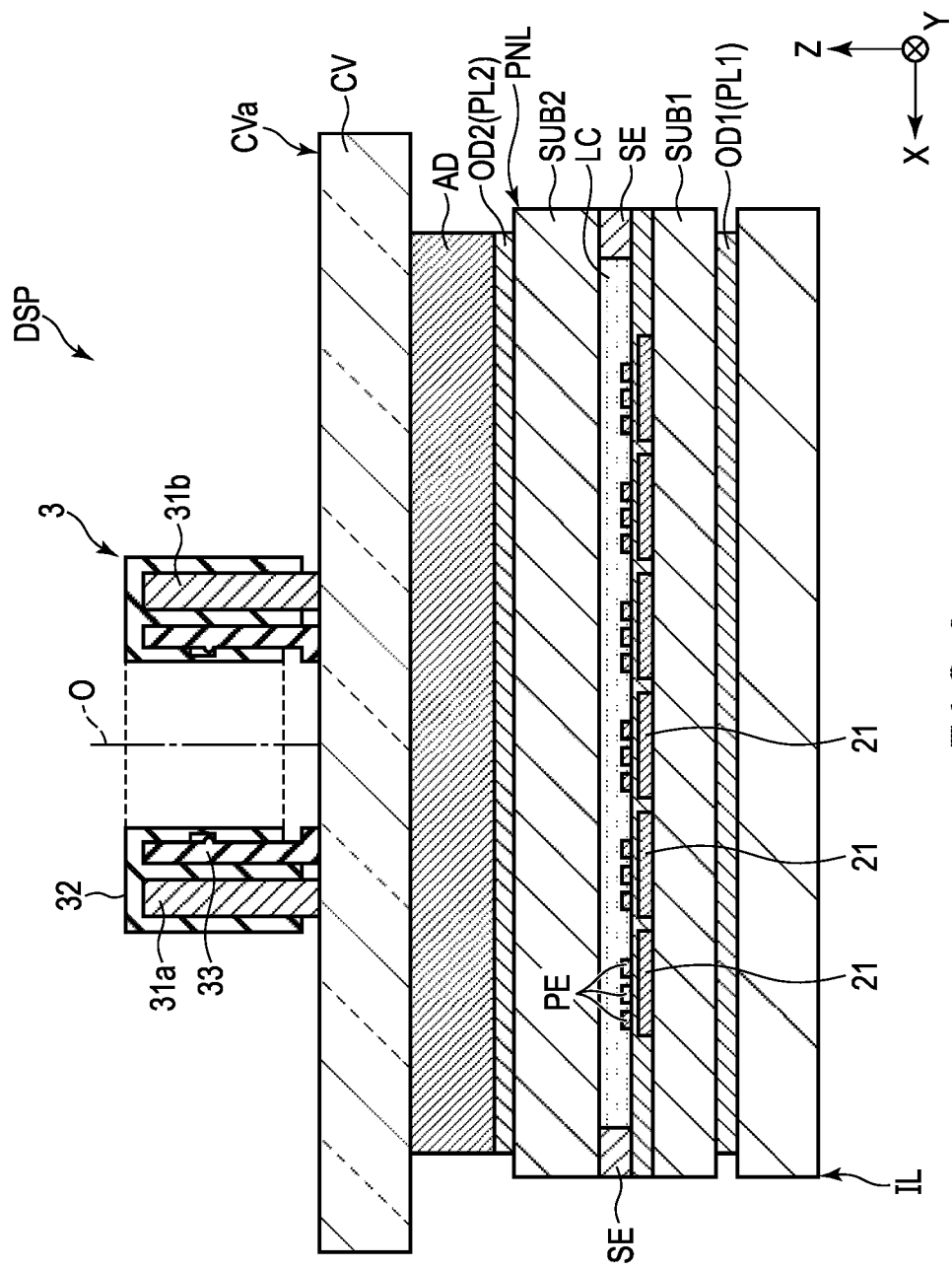
F I G. 3

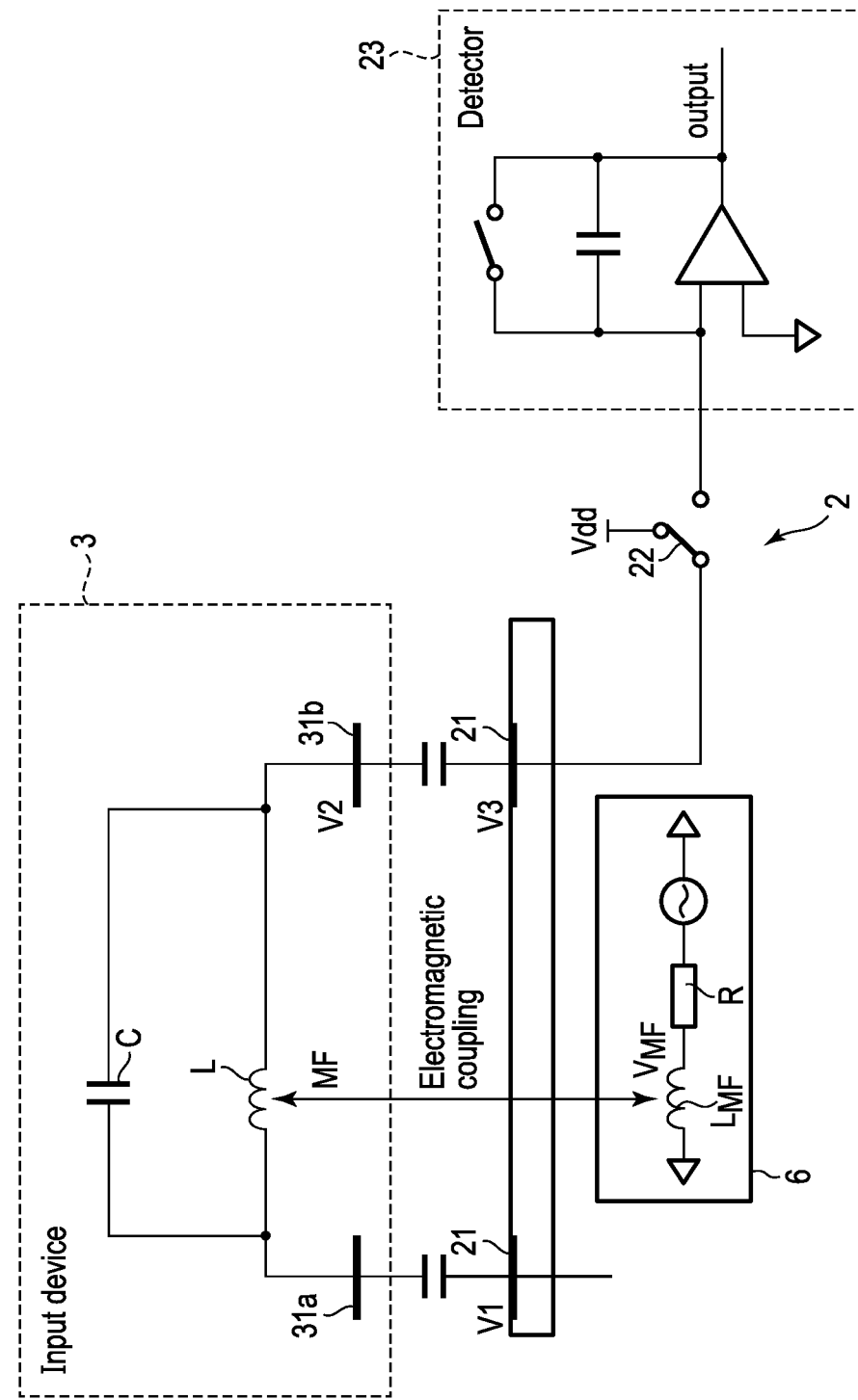
F I G. 7

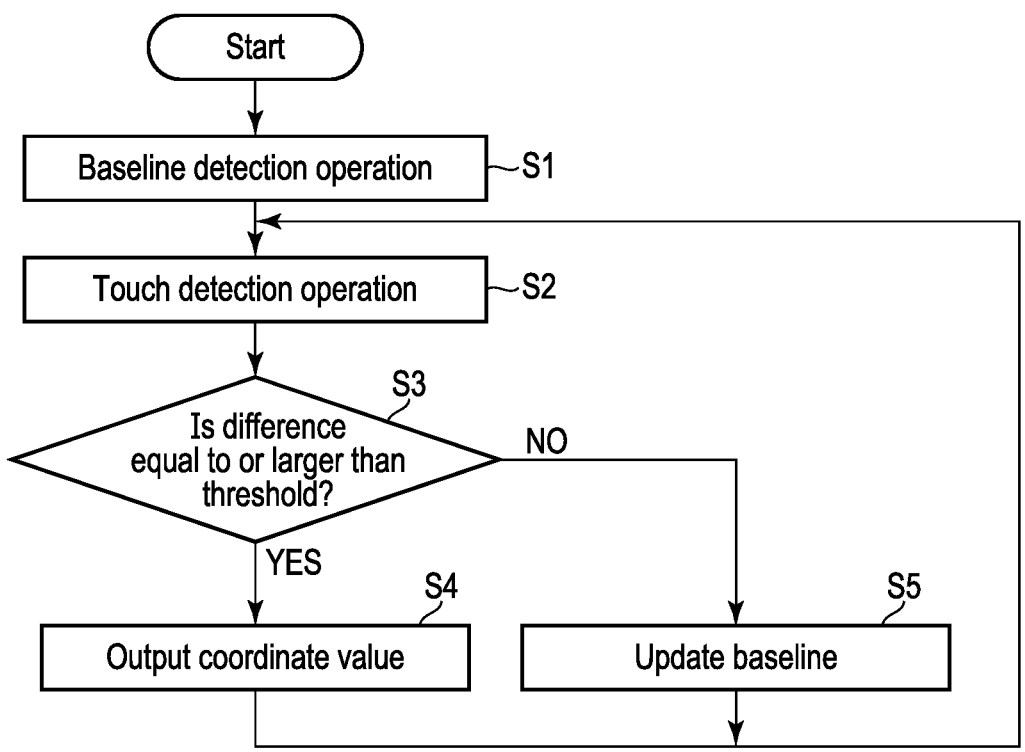
F I G. 16

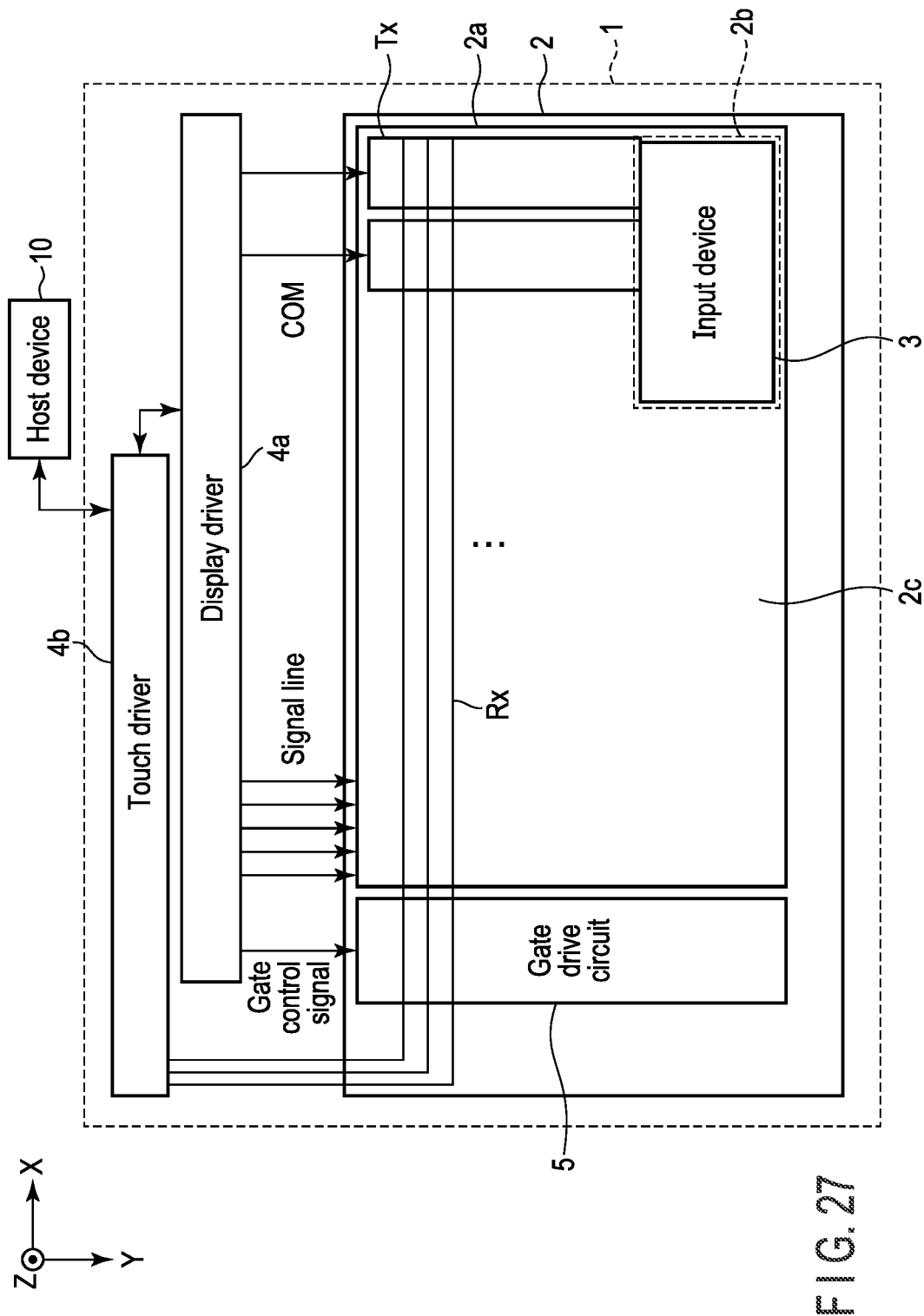
F I G. 27

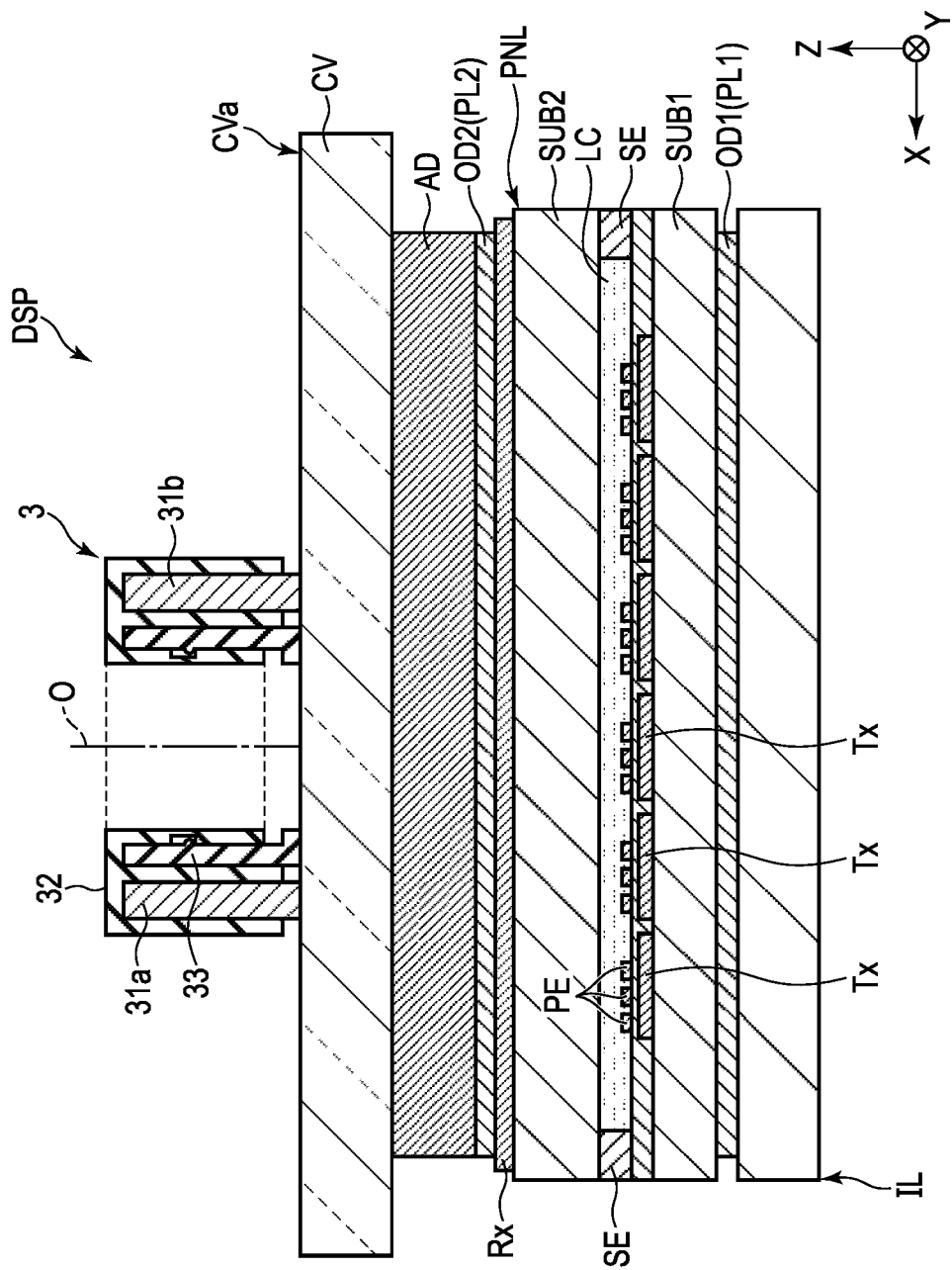
F I G. 28

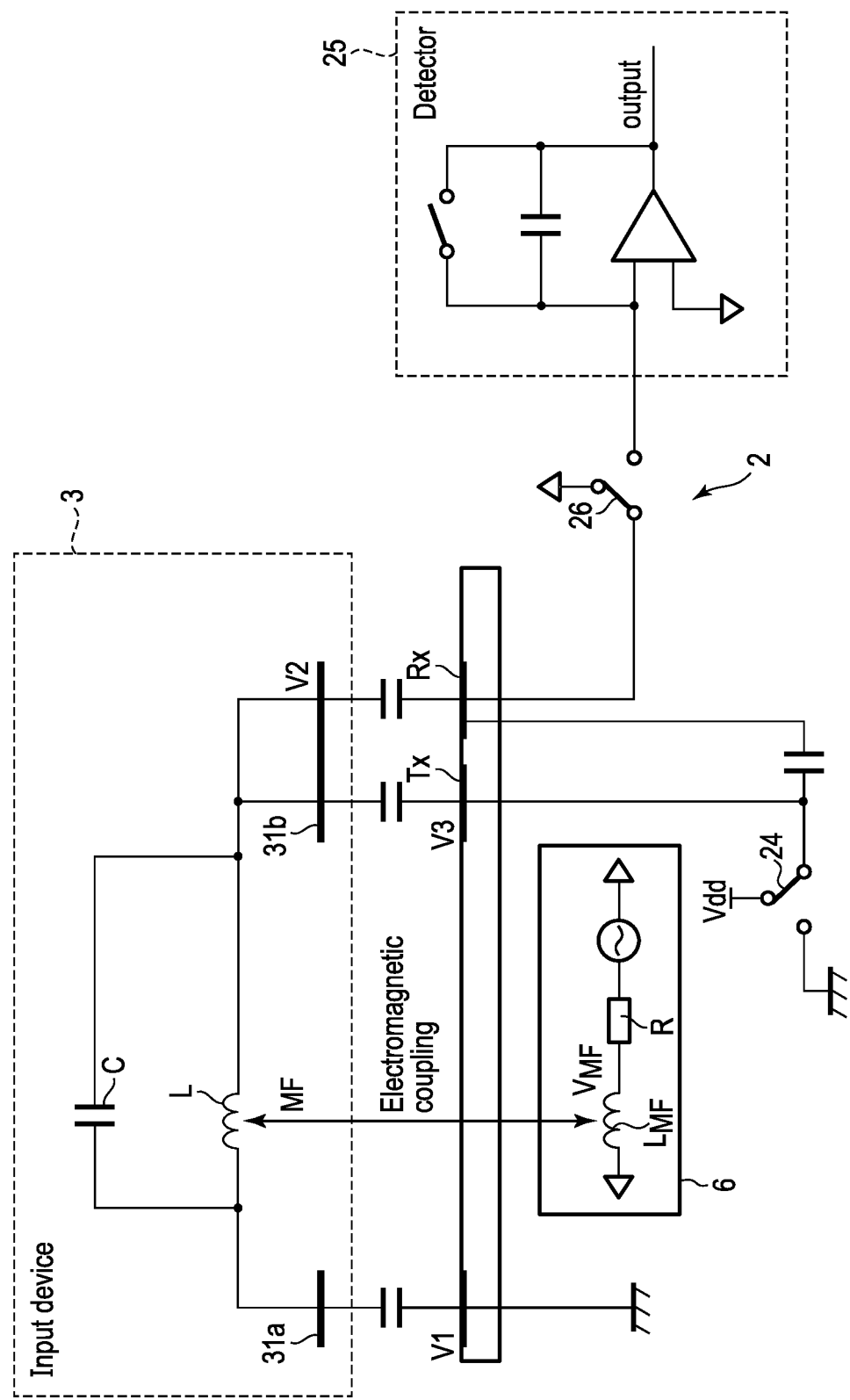
F I G. 29

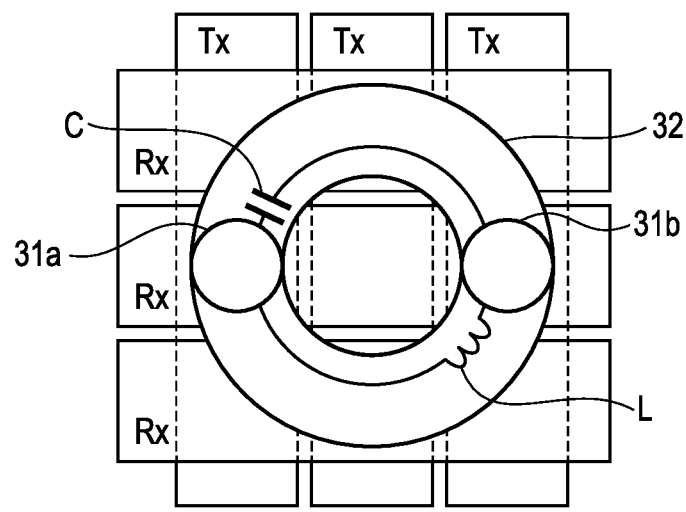
F I G. 35
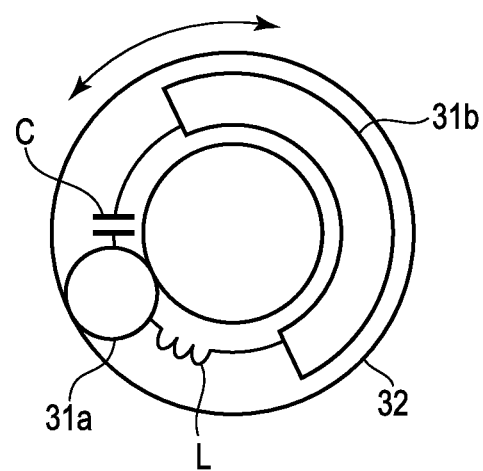
F I G. 36

SENSOR DEVICE, INPUT DEVICE AND METHOD

CROSS-REFERENCE TO RELATED APPLICATIONS

This application is a Continuation Application of PCT Application No. PCT/JP2020/006918, filed Feb. 20, 2020 and based upon and claiming the benefit of priority from Japanese Patent Application No. 2019-090053, filed May 10, 2019, the entire contents of all of which are incorporated herein by reference.

FIELD

Embodiments described herein relate generally to a sensor device, an input device and a method.

BACKGROUND

In general, as an interface of a display device, a sensor that detects contact or proximity of an object such as a finger (for example, a touch panel) has been put into practical use.

Furthermore, in recent years, it has been disclosed that an input device is disposed (attached) on a touch panel and used.

In this case, a user can operate the input device disposed on the touch panel, but it is necessary to detect an operation of the user on the input device with high accuracy.

BRIEF DESCRIPTION OF THE DRAWINGS

FIG. 2 is a diagram illustrating an example of a configuration of the sensor device.

FIG. 3 is a diagram illustrating an example of a cross-sectional structure of a display device on which the sensor device is mounted.

FIG. 7 is a diagram for explaining a basic principle of a touch detection operation using the resonant circuit.

FIG. 16 is a flowchart illustrating an example of a first process of a sensor controller.

FIG. 27 is a diagram illustrating an example of a configuration of a sensor device according to a second embodiment.

FIG. 28 is a diagram illustrating an example of a cross-sectional structure of a display device on which the sensor device is mounted.

FIG. 29 is a diagram for explaining a basic principle of a touch detection operation using a resonant circuit.

FIG. 35 is a diagram for explaining a case where a position of an input device cannot be detected.

FIG. 36 is a diagram illustrating an example of a planar structure of the input device.

DETAILED DESCRIPTION

Figure 1:
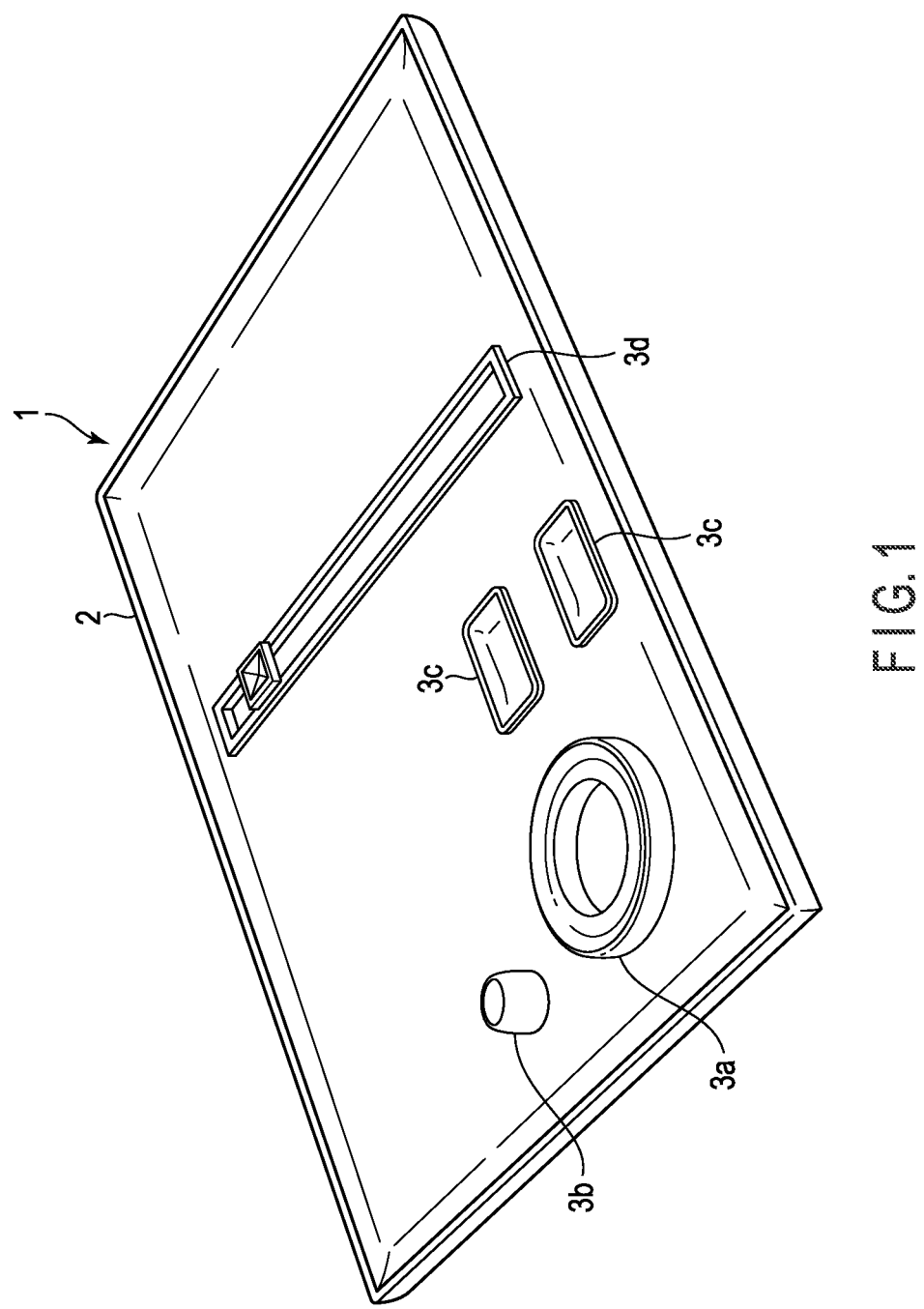
FIG. 1 is a perspective view illustrating an example of an external appearance of a sensor device according to a first embodiment.

In general, according to one embodiment, a sensor device includes a touch panel including a plurality of electrodes, an input device configured such that a resonant circuit including a first conductive material and a second conductive material is covered with a non-conductive material, a magnetic field generation source disposed at a position overlapping the touch panel and configured to generate a magnetic field, and a sensor controller configured to control the touch panel. Each of the first conductive material and the second conductive material is capacitively coupled to at least one of the plurality of electrodes included in the touch panel. The resonant circuit is electromagnetically coupled to the magnetic field generation source so as to resonate based on a magnetic field generated by the magnetic field generation source. The sensor controller is configured to detect positions of the first conductive material and the second conductive material on the touch panel by applying a voltage to each of the plurality of electrodes included in the touch panel according to an operation of the magnetic field generation source.

Various embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

First Embodiment

FIG. 1 is a perspective view illustrating an example of an external appearance of a sensor device according to a first embodiment. A sensor device 1 according to the present embodiment includes an electrostatic capacitance touch panel 2 as a sensor capable of detecting contact or proximity of an object such as a finger (hereinafter, referred to as touch detection).

As the electrostatic capacitance touch panel 2, for example, there is a touch panel that performs self-capacitive type touch detection and mutual-capacitive type touch detection. In the present embodiment, a touch panel 2 that performs self-capacitive type touch detection (hereinafter, referred to as a self-capacitive type touch panel 2) will be described.

Although not illustrated in FIG. 1, the touch panel 2 is mounted on, for example, a display device (display panel). In this case, the touch panel 2 may be formed on a display surface of the display device, or may be integrated with the display device. The display device is, for example, a liquid crystal display device using a liquid crystal layer, but may be an organic electro luminescence (EL) display device using an organic emitting layer, a light emitting diode (LED) display device using an LED, or the like.

In addition, the sensor device 1 according to the present embodiment further includes an input device used by being disposed (attached) on the touch panel 2. The input device in the present embodiment includes, for example, input devices 3a to 3d.

The input device 3a is, for example, an input device configured as a knob rotatable about a rotation axis. A user can perform an operation of rotating the input device 3a (knob) by disposing the input device 3a on the touch panel 2.

The input device 3b is an input device configured as a finger grip rotatable about a rotation axis. A user can perform an operation of rotating the input device 3b (finger grip) by disposing the input device 3b on the touch panel 2.

The input device 3c is an input device configured as a button capable of switching between a pressed state (first state) and an unpressed state (second state). A user can perform an operation of pressing the input device 3c (button) by disposing the input device 3c on the touch panel 2.

The input device 3d is an input device configured as a slider including a member (first member) formed to be elongated at least unidirectionally and a member (second member) formed to be slidable along the member. A user can perform an operation of sliding the second member of the input device 3d (slider) with respect to the first member by disposing the input device 3d on the touch panel 2.

In the example illustrated in FIG. 1, the input devices 3a to 3d are disposed on the touch panel 2, but at least one of the input devices 3a to 3d may be disposed on the touch panel 2. Furthermore, although the input devices 3a to 3d have been described here, the input device in the present embodiment may be any device as long as it is disposed (attached) on the touch panel 2 and used, and may be, for example, a joystick, a jog dial (wheel), or the like.

FIG. 2 illustrates an example of a configuration of the sensor device 1 according to the present embodiment. As illustrated in FIG. 2, the sensor device 1 includes the touch panel 2, the input device 3, and a sensor controller 4.

The touch panel 2 is a self-capacitive type touch panel as described above, and includes a plurality of transparent electrodes (hereinafter, referred to as drive electrodes) 21. The plurality of drive electrodes 21 are arrayed in a matrix in a touch detection area 2a that detects contact or proximity of an object to the touch panel 2. Specifically, the plurality of drive electrodes 21 are disposed, for example, in a first direction X and are also disposed in a second direction orthogonal to the first direction X. The touch detection area 2a is an area that is coincident with a display area of the display device on which the touch panel 2 is mounted, for example. The plurality of drive electrodes 21 are connected to the sensor controller 4 via wiring.

The input device 3 is disposed on the touch panel 2. The input device 3 may be at least one of the input devices 3a to 3d illustrated in FIG. 1. In the following description, description will be mainly given assuming that the input device 3 disposed on the touch panel 2 is the input device 3a (knob) described above.

The input device 3 is disposed on the touch panel 2, and an area 2b of the touch detection area 2a where the input device 3 is disposed (that is, an area overlapping the input device 3) is referred to as an input device area (first area) for convenience. On the other hand, an area 2c other than the input device area 2b in the touch detection area 2a is referred to as an input device outer area (second area) for convenience.

The sensor controller 4 detects an operation of the user on the input device 3 by applying a predetermined voltage (drive signal COM) to each of the plurality of drive electrodes 21. Furthermore, the sensor controller 4 can also detect, for example, contact or proximity of a user's finger (that is, an operation of the user with the finger) with respect to the input device outer area 2c. In the present embodiment, the description will be given assuming that the operation is performed with the user's finger other than the input device 3, but an operation using another object such as a pen instead of the user's finger may be performed.

The detection result by the sensor controller 4 is output to, for example, an external host device 10 or the like. In the host device 10, processing according to the detection result (operation of the user) is executed.

A plurality of pixels (not illustrated) are arrayed in a matrix in the display area of the display device on which the touch panel 2 is mounted. Each of the plurality of pixels includes a pixel switch (thin film transistor (TFT)), a pixel electrode, and the like. The sensor controller 4 is connected to a gate drive circuit 5 and the like, and supplies a gate control signal to (a gate electrode of) the pixel switch included in each of the plurality of pixels via the gate drive circuit 5. As a result, the sensor controller 4 writes, for example, an image signal output from the host device 10 to each of the plurality of pixels via a signal line, and displays an image in the display area of the display device.

That is, in the present embodiment, the sensor controller 4 functions as a display and touch detection IC (drive unit) that performs an operation of displaying an image on the display device (display area) and an operation of detecting a position of an object on the touch panel 2 (that is, detecting the operation of the user). In the following description, the operation of displaying an image on the display device (first operation) is referred to as a display/write operation for convenience. In addition, in the following description, the operation of detecting the position of the object on the touch panel 2 (second operation) is referred to as a touch detection operation for convenience.

Each of the plurality of drive electrodes 21 described above may also be used as an electrode for image display (common electrode).

FIG. 3 illustrates an example of a cross-sectional structure of a display device DSP on which the sensor device 1 is mounted. The display device DSP includes a display panel PNL and an illumination device IL. In one example, the display panel PNL is, for example, a liquid crystal display panel, and includes a first substrate SUB1, a second substrate SUB2, and a liquid crystal layer LC.

The first substrate SUB1 and the second substrate SUB2 are bonded by a sealant SE. The liquid crystal layer LC is held between the first substrate SUB1 and the second substrate SUB2.

The display panel PNL has the touch panel 2 of the sensor device 1 built therein. That is, the first substrate SUB1 includes the drive electrodes (common electrodes) 21 of the touch panel 2 and pixel electrodes PE. One drive electrode 21 faces, for example, the plurality of pixel electrodes PE.

An optical element OD1 including a polarizer PL1 is located between the first substrate SUB1 and the illumination device IL, and is bonded to the first substrate SUB1. An optical element OD2 including a polarizer PL2 is located between the second substrate SUB2 and a cover member CV (cover glass), and is bonded to the second substrate SUB2. The cover member CV is bonded to the optical element OD2 by a transparent adhesive AD.

Although not illustrated in FIG. 3, the sensor controller 4 described above is disposed on the first substrate SUB1, for example, and is connected to the host device 10 via a flexible printed circuit or the like connected to the first substrate SUB1.

The input device 3 is provided (disposed) on a surface CVa of the cover member CV. In the present embodiment, the input device 3 includes two conductive materials (first conductive material and second conductive material) 31a and 31b, and the conductive materials 31a and 31b are covered with a non-conductive material 32. The conductive materials 31a and 31b are in contact with, for example, the touch panel 2 (cover member CV) in a state where the input device 3 is disposed on the touch panel 2. That is, when the input device 3 is disposed on the touch panel 2, the touch panel 2 (sensor controller 4) can detect contact or proximity (that is, touch) by the conductive materials 31a and 31b included in the input device 3.

In FIG. 3, it is assumed that the input device 3 is the input device 3a described above, and the non-conductive material 32 is formed in a knob shape. In this case, the input device 3 is formed in a tubular shape elongated along the rotation axis O. In addition, the conductive materials 31a and 31b are held by the non-conductive material 32 formed in a knob shape, and are disposed on a part of the circumference around the rotation axis O.

The input device 3 includes a fixing body 33 illustrated in FIG. 3, and is disposed (attached) to touch panel 2 (front surface CVa) via the fixing body 33.

Although FIG. 3 illustrates an in-cell display device DSP in which the touch panel 2 is built in the display panel PNL, the display device DSP may be an out-cell type or an on-cell type in which the touch panel 2 is provided so as to overlap the display panel PNL.

In a case where the input device 3 is disposed on the touch panel 2 as described above, for example, an operation of a user corresponding to the positions of the conductive materials 31a and 31b on the touch panel 2 that change by rotating the input device 3 (knob) is detected. Specifically, for example, when the position of the conductive material 31a (or 31b) on the touch panel 2 moves from the first position to the second position, the touch panel 2 (sensor controller 4) can detect an operation of rotating the input device 3 so that the position of the conductive material 31a on the touch panel 2 moves from the first position to the second position.

Here, the input device 3 in the present embodiment may be directly operated with a user's finger (that is, with bare hands), for example, but it is also assumed that the input device 3 may be operated by a non-conductive material such as a glove. Since it is complicated to perform different operations (touch detection operations) between the case of being directly operated with a finger and the case of being operated with a glove or the like, in the present embodiment, the conductive materials 31a and 31b described above are not electrically connected to the outside of the input device 3.

However, as an operation of a user on the input device 3 (that is, the positions of the conductive materials 31a and 31b on the touch panel 2) is detected based on a change in self-electrostatic capacitance of the drive electrodes 21 when the conductive materials 31a and 31b come into contact with or come close to the touch panel 2, in a case where the conductive materials 31a and 31b are not electrically connected to the outside as described above, a detection value (sensor signal) for the conductive materials 31a and 31b decreases, which causes error detection.

For this reason, in the present embodiment, a resonant circuit including the conductive materials 31a and 31b is manufactured inside the input device 3, and the touch detection operation is performed based on an electric potential change due to resonance generated by electromagnetic resonance.

Figure 4:
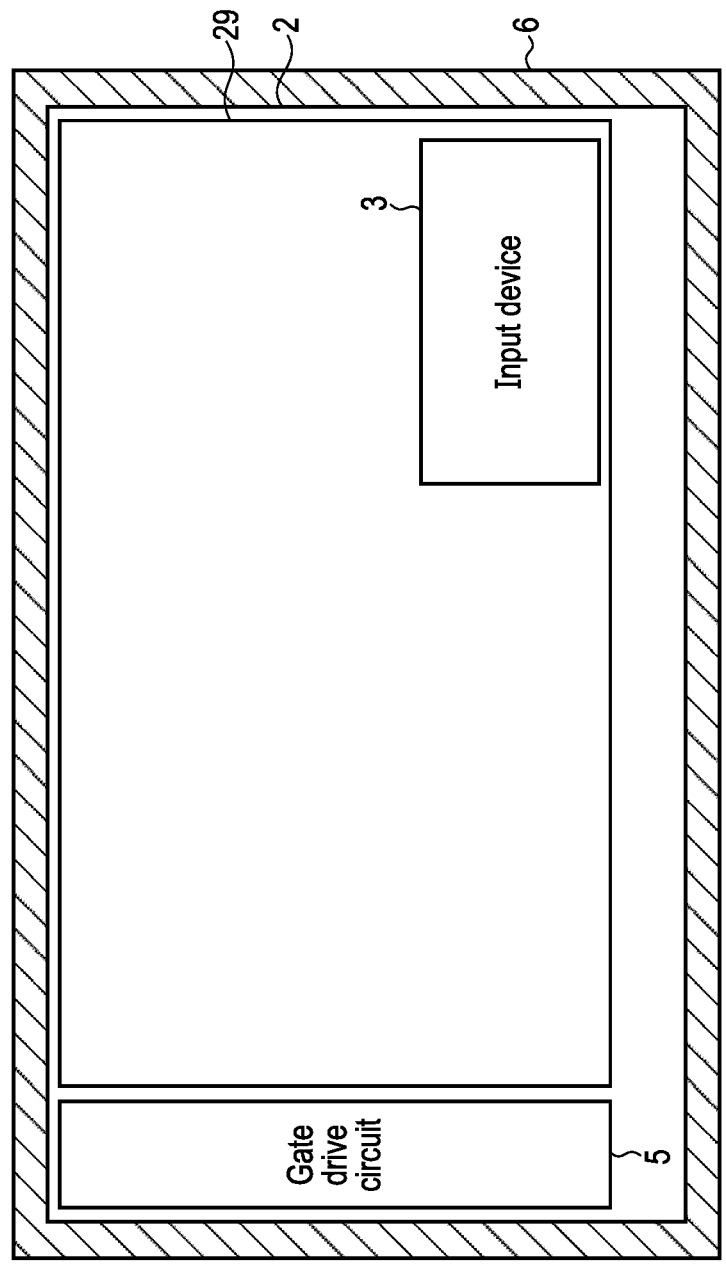
FIG. 4 is a diagram illustrating an example of a positional relationship between a touch panel and a magnetic field generation source.

In this case, in the present embodiment, as illustrated in FIG. 4, a magnetic field generation source 6 configured to generate a magnetic field is disposed at a position overlapping the touch panel 2. In FIG. 4, the magnetic field generation source 6 having a size enough to include the touch panel 2 in planar view is disposed, but the magnetic field generation source 6 may be disposed at a position overlapping at least the touch detection area 2a.

The magnetic field generation source 6 may be provided outside the touch panel 2 or may be incorporated in the touch panel 2.

Figure 5:
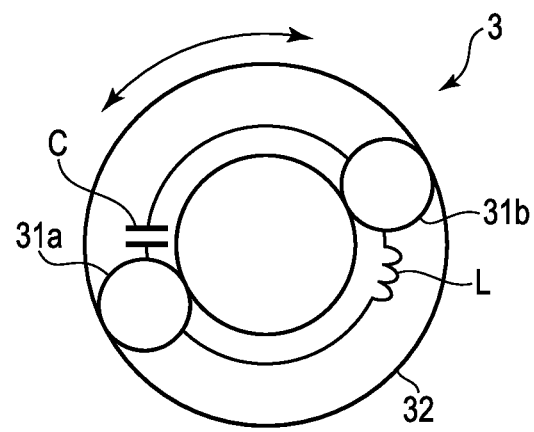
FIG. 5 is a diagram illustrating an example of a planar structure of an input device.

FIG. 5 illustrates an example of a planar structure of the input device 3 (input device 3a). As illustrated in FIG. 5, the resonant circuit (LC circuit) including the conductive material 31a, the conductive material 31b, an inductor L, and a capacitor C is provided inside the input device 3 (nonconductive material 32) in the present embodiment. In the present embodiment, when the input device 3 is disposed on the touch panel 2 or when the input device 3 disposed on the touch panel 2 is operated, the conductive materials 31a and 31b are capacitively coupled to the drive electrodes 21 disposed at positions facing the conductive materials 31a and 31b.

In addition, the resonant circuit (inductor L) provided inside the input device 3 is magnetically coupled to the magnetic field generation source 6 so as to resonate based on the magnetic field generated by the magnetic field generation source 6 when the input device 3 is disposed on the touch panel 2 or when the input device 3 disposed on the touch panel 2 is operated.

Next, an example of a circuit configuration of a resonant circuit provided inside the input device 3 will be described with reference to FIG. 6.

Figure 6:
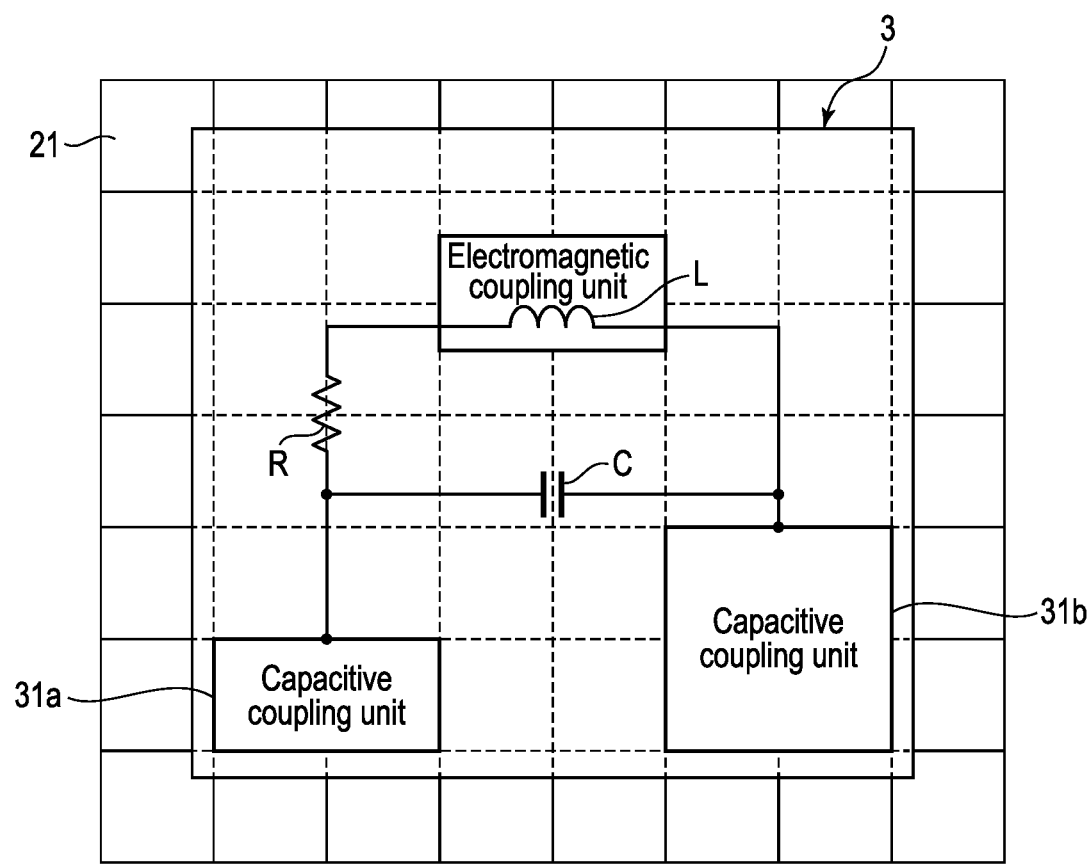
FIG. 6 is a diagram for explaining an example of a circuit configuration of a resonant circuit provided inside the input device.

As illustrated in FIG. 6, the conductive materials 31a and 31b included in the input device 3 function as capacitive coupling units that are capacitively coupled to the drive electrodes 21 of the touch panel 2 when voltages are applied to the drive electrodes 21. In the example illustrated in FIG. 6, the sizes of the capacitive coupling units (areas of the conductive materials 31a and 31b in contact with or in proximity to the touch panel 2) are different, but the sizes of the capacitive coupling units may be the same.

In the resonant circuit provided inside the input device 3, the inductor L and the capacitor C are connected in parallel between the conductive materials 31a and 31b. In the resonant circuit illustrated in FIG. 5, a resistor R is further provided.

The inductor L included in the resonant circuit described above functions as an electromagnetic coupling unit when the magnetic field generation source 6 generates a magnetic field.

In the present embodiment, for example, a change (movement) in the position of the capacitive coupling unit with respect to the touch detection area 2a (drive electrode 21) when a user operates the input device 3 is detected via such a resonant circuit. A change in the area (that is, the contact area) of the capacitive coupling unit may be detected.

A basic principle of the touch detection operation using the resonant circuit provided inside the input device 3 will be described below with reference to FIG. 7. The resistor R is omitted in the resonant circuit illustrated in FIG. 7.

In the present embodiment, since the self-capacitive type touch detection (operation) is performed, the drive electrode 21 is alternately connected to a predetermined voltage (drive voltage) Vdd and a detector 23 (that is, the connection is switched) via a switch 22 as illustrated in FIG. 7.

Here, the voltage of the drive electrode 21 disposed at a position facing the conductive material 31a (capacitive coupling unit) is V1, the voltage of the conductive material 31b (capacitive coupling unit) is V2, and the voltage of the drive electrode 21 disposed at a position facing the conductive material 31b is V3. In the present embodiment, each of the plurality of drive electrodes 21 is simultaneously driven (that is, Vdd is simultaneously applied to each of the plurality of drive electrodes 21).

As illustrated in FIG. 7, the magnetic field generation source 6 includes a circuit (magnetic field generation circuit) including an inductor $L_{MF}$ and the resistor R, and generates a magnetic field MF by applying a voltage $V_{MF}$ to the circuit. As a result, the inductor L of the resonant circuit and the inductor $L_{MF}$ of the magnetic field generation source 6 (magnetic field generation circuit) are magnetically coupled (electromagnetically coupled). When the magnetic field generation source 6 operates (drives) at substantially the same frequency as the resonance frequency, resonance occurs in the resonant circuit provided inside the input device 3. When resonance occurs in the resonant circuit, the conductive materials 31a and 31b resonate in opposite phases.

Figure 8:
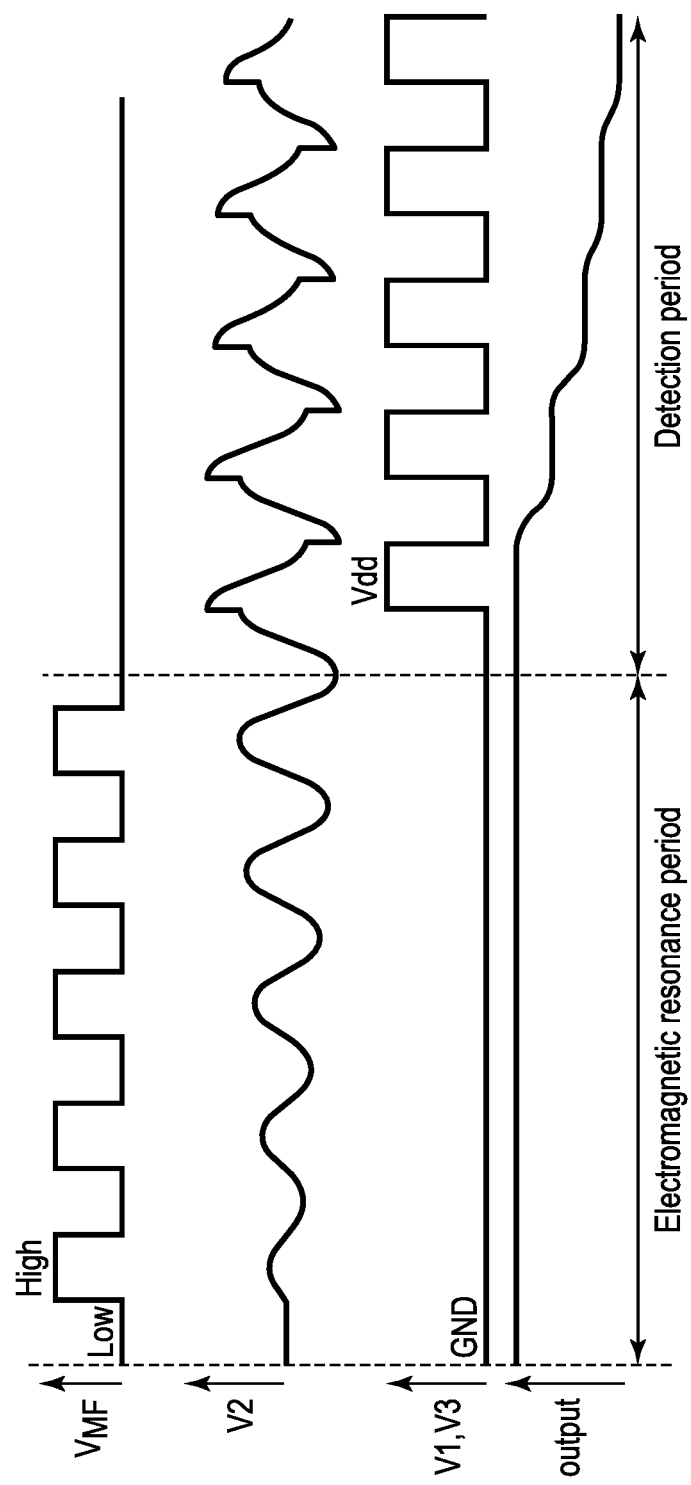
FIG. 8 is a diagram illustrating an example of a relationship between each voltage at the time of the touch detection operation and a detection value output from a detector.

Here, FIG. 8 illustrates an example of a relationship between each of the voltage $V_{MF}$ and V1 to V3 and the detection value (output) output from the detector 23 in the touch detection operation described above.

In the present embodiment, as illustrated in FIG. 8, an electromagnetic resonance period in which the voltage $V_{MF}$ is applied (that is, the magnetic field generation source 6 generates a magnetic field) in the magnetic field generation source 6 and a detection period for touch detection are provided.

Figure 9:
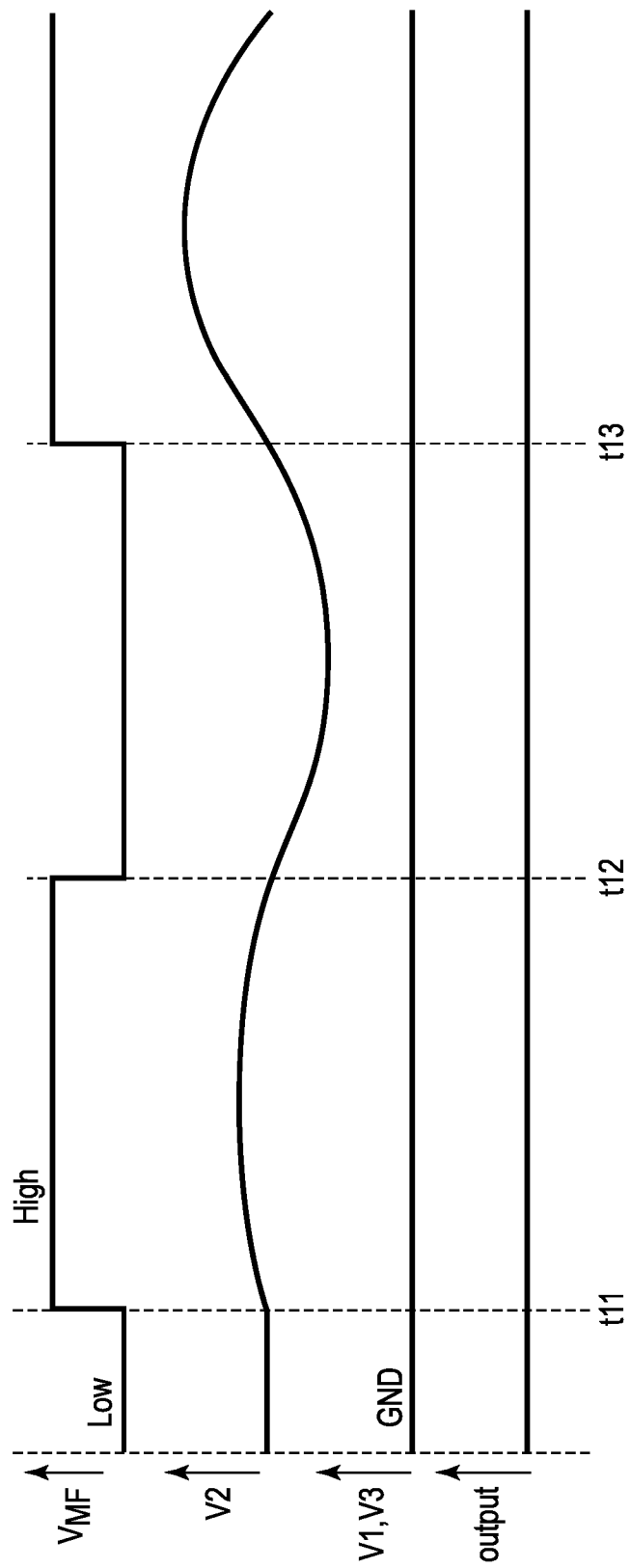
FIG. 9 is a diagram for explaining an operation in an electromagnetic resonance period.

First, the electromagnetic resonance period will be described with reference to FIG. 9. At time t11 of the electromagnetic resonance period, $V_{MF}$ in the magnetic field generation source 6 is switched from low to high. As described above, since $V_{MF}$ changes at the time t11, the current flowing through the inductor $L_{MF}$ of the magnetic field generation source 6 changes. For this reason, the magnetic flux passing through the inductor L of the input device 3 electromagnetically coupled to the inductor $L_{MF}$ changes, and an induced electromotive force is generated. As a result, the resonant circuit provided in the input device 3 starts to resonate.

Here, when time t12 (that is, half the period of resonance) elapses, the direction of the current flowing through the inductor L of the input device 3 becomes opposite to that at the time t11.

Furthermore, since $V_{MF}$ is switched (changed) from high to low at the time t12, an induced electromotive force is generated in the inductor L, but the direction thereof is opposite to that at the time t11.

In the electromagnetic resonance period, the resonance amplitude increases by repeating such overlapping.

Next, the detection period will be described with reference to FIG. 10. Unlike the electromagnetic resonance period described above, $V_{MF}$ does not change (is constant) from low in the detection period. For this reason, no electromotive force is generated in the inductor L of the input device 3, but the resonant circuit provided in the input device 3 continues to resonate.

Figure 10:
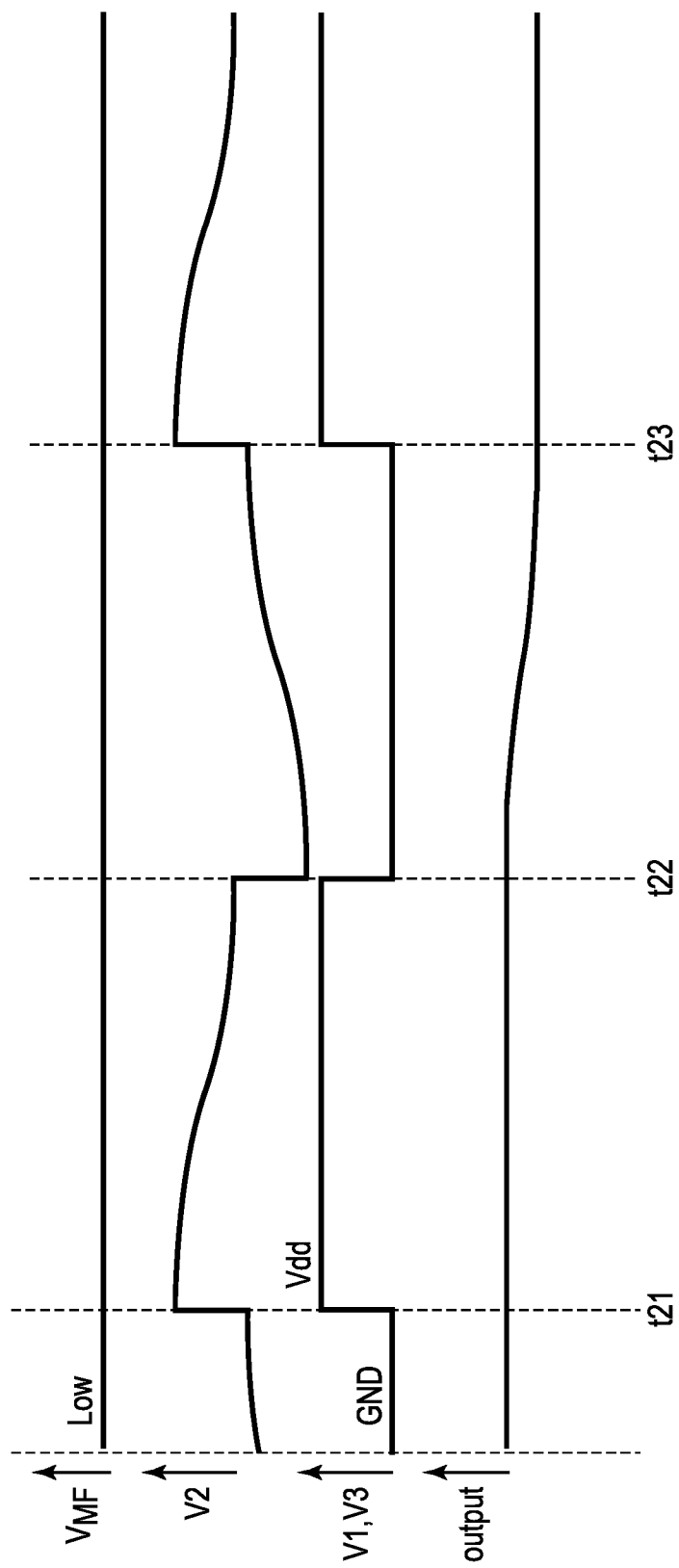
FIG. 10 is a diagram for explaining an operation in a detection period.

Here, in the example illustrated in FIGS. 10, V1 and V3 are Vdd at time t21 when V2 becomes maximum. The electric potential of the input device 3 changes similarly to V1 and V3, but the electric potential difference between both edges of LC in the resonant circuit does not change, so that the resonant circuit continues to resonate. For this reason, in the period from the time t21 to time t22, V2 decreases. As a result, V2 becomes minimum at the time t22.

Here, when the switch 22 (that is, V1 and V3) is switched to the detector 23 side at the time t22, the electric potential of the input device 3 changes similarly to V1 and V3, but the electric potential difference between both edges of LC in the resonant circuit does not change, so that resonance continues as described above.

In this case, since V2 increases during the period from the time t22 to time t23, the current flows from the input device 3 side to the detector 23 side, and the electric potential of the output decreases.

In the detection period, such an operation is repeated, so that a detection value (output) as illustrated in FIG. 8 can be obtained.

Here, the detection value in the drive electrode 21 disposed at the position facing the conductive material 31b has been described, but the same applies to the detection value in the drive electrode 21 disposed at the position facing the conductive material 31a.

Although it has been described here that the detection period is provided after the electromagnetic resonance period, in the present embodiment, it is sufficient that the voltage (Vdd) is applied to each of the plurality of drive electrodes 21 included in the touch panel 2 according to the operation of the magnetic field generation source 6, and the electromagnetic resonance period and the detection period described above may overlap.

Figure 11:
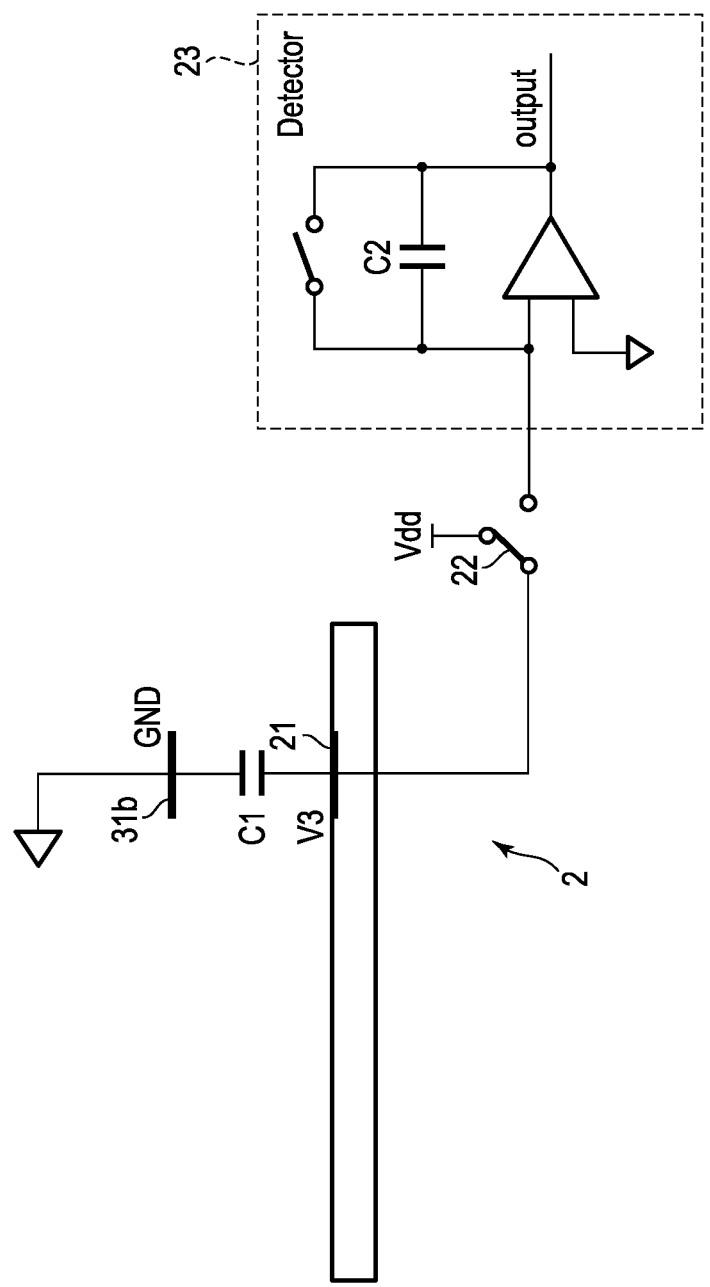
FIG. 11 is a diagram for explaining a case where a user's finger is present at a position facing a drive electrode.
Figure 12:
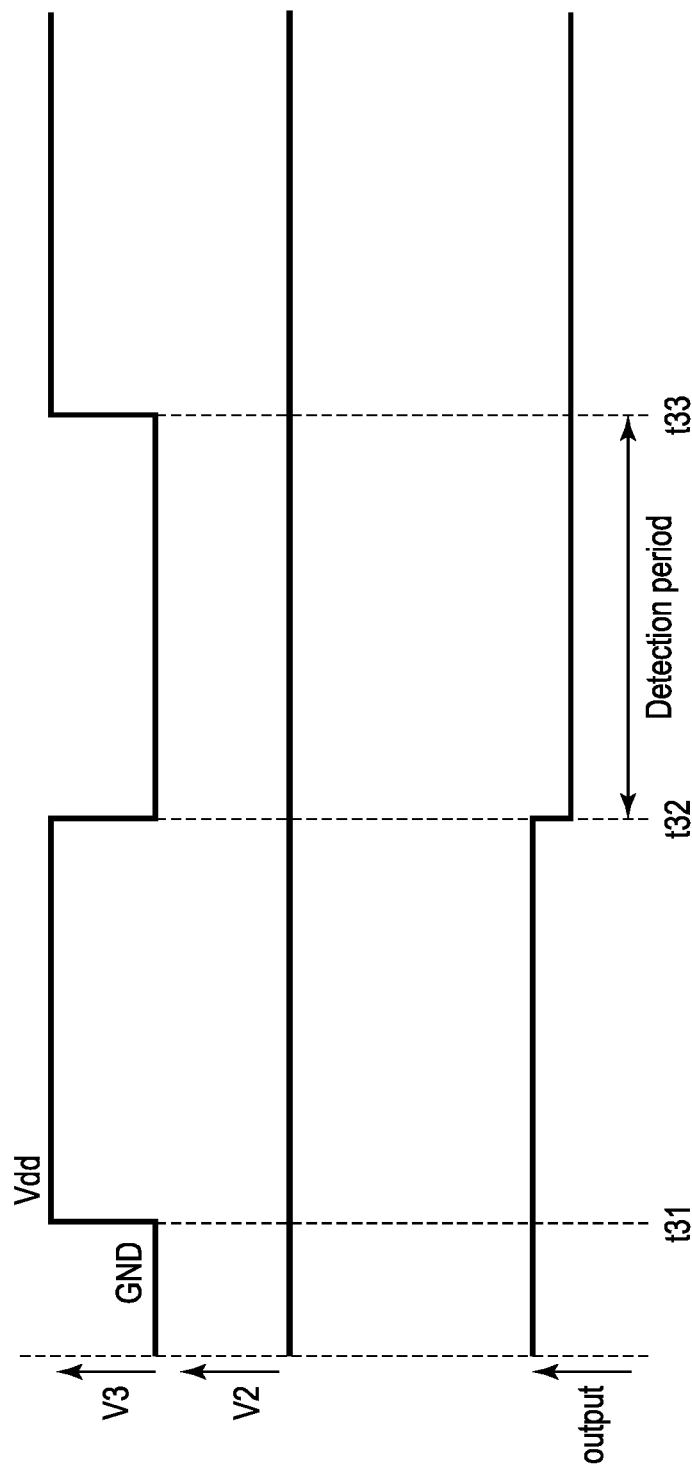
FIG. 12 is a diagram for explaining the case where the user's finger is present at the position facing the drive electrode.

Next, with reference to FIGS. 11 and 12, a case where a user's finger is present at a position facing the drive electrode 21 (that is, the drive electrode 21 and GND hold the capacitance) will be briefly described. In FIGS. 11 and 12, the same reference signs are assigned to the same portions as those in FIGS. 7 to 10 referred to above.

Here, the capacitance (electrostatic capacitance) between the user's finger and the drive electrode 21 on the touch panel 2 side is C1, and the capacitance on the detector 23 side is C2.

Figure 13:
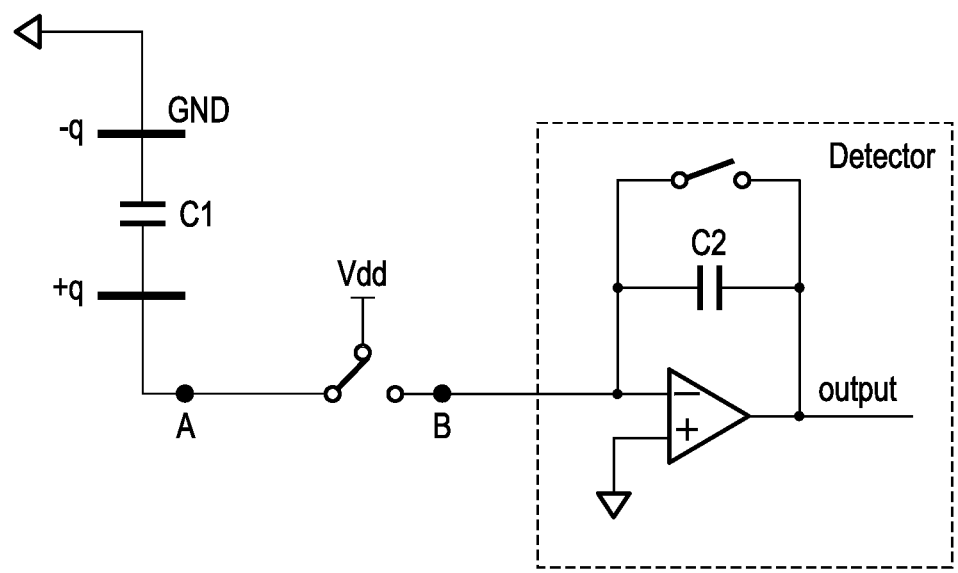
FIG. 13 is a diagram illustrating a state in which a charge is stored in a system of the drive electrode.

When the switch 22 is connected to the Vdd side at time t31 illustrated in FIG. 12, charges are charged in the system of the drive electrode 21 in a period from the time t31 to time t32. FIG. 13 illustrates a state in which a charge q is stored in C1 when the switch 22 is connected to Vdd.

Figure 14:
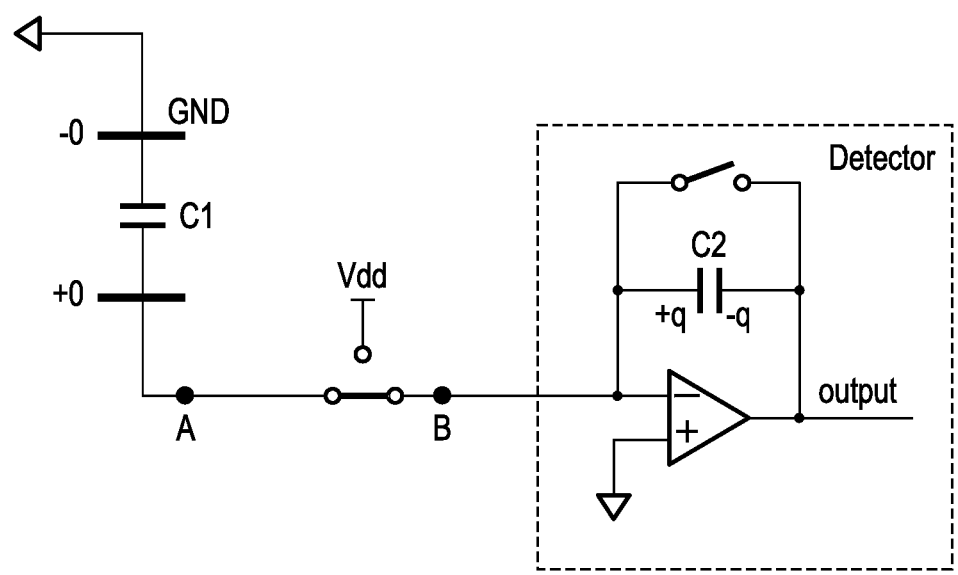
FIG. 14 is a diagram illustrating a state in which the charge is stored in a system of the detector.

Next, when the switch 22 is connected to the detector 23 side at the time t32, the electric potential of the system of the drive electrode 21 becomes GND due to an imaginary short. At this time, since there is no electric potential difference, C1 has no charge. Therefore, the charged charge q is charged to C2, and an electric potential difference is generated between both edges of C2. FIG. 14 illustrates a state in which the charge q is stored in C2 when the switch 22 is connected to the detector 23.

In a case where the drive electrode 21 and GND hold the capacitance, negative charges are charged by repeating the operation described above.

Even when the capacitive coupling unit capacitively coupled to the drive electrode 21 is not GND, if an electric potential difference is generated at both edges of C1, charges are similarly charged.

That is, for example, even in a configuration in which a resonant circuit is not provided inside the input device 3 and the input device 3 holds only conductive materials, charges can be charged, but a detection value in this case is small.

On the other hand, in the present embodiment, the detection value can be increased by the configuration in which the resonant circuit including the conductive materials 31a and 31b is provided inside the input device 3 as described above.

Here, the touch panel 2 generally detects a change from a state when power of the touch panel 2 is turned on (that is, at the time of startup). For this reason, when the input device 3 is already disposed on the touch panel 2 at the time when the power of the touch panel 2 is turned on, the initial state (that is, the initial positions of the conductive materials 31a and 31b) of the input device 3 cannot be detected.

However, in the present embodiment, due to the configuration in which the resonant circuit described above is provided inside the input device 3, for example, even in a state where the input device 3 (that is, the conductive materials 31a and 31b) is disposed at the same position, the detection value is different between a case where the touch detection operation is performed without operating the magnetic field generation source 6 and a case where the touch detection operation is performed by operating the magnetic field generation source 6.

Hereinafter, with reference to FIG. 15, differences in detection values according to the presence or absence of the operation of the magnetic field generation source 6 will be described. The upper part of FIG. 15 illustrates a case where the drive electrode 21 is driven without operating the magnetic field generation source 6 (that is, the magnetic field generation source 6 does not generate the magnetic field MF), and the lower part of FIG. 15 illustrates a case where the drive electrode 21 is driven by operating the magnetic field generation source 6 (that is, the magnetic field generation source 6 generates the magnetic field MF).

Figure 15:
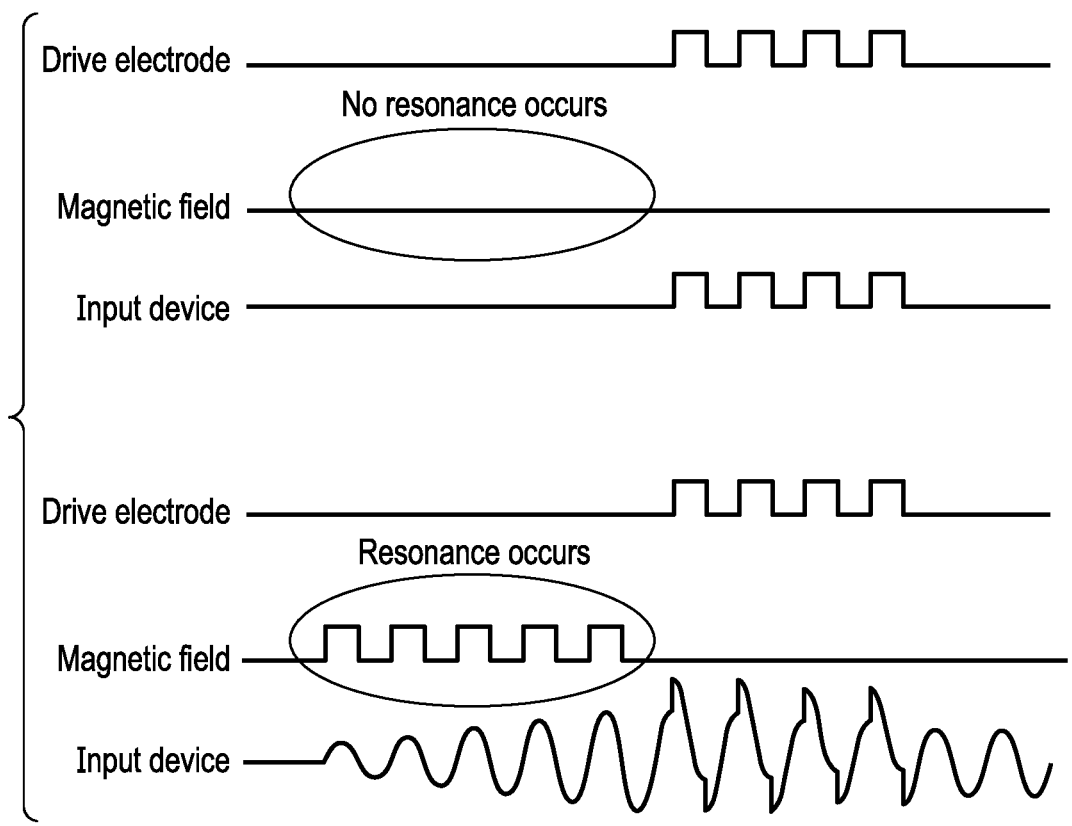
FIG. 15 is a diagram for explaining a difference in detection values according to presence or absence of an operation of the magnetic field generation source.

As illustrated in the upper part of FIG. 15, in the case where the drive electrode 21 is driven without operating the magnetic field generation source 6, resonance does not occur in the resonant circuit, and thus the detection value decreases. On the other hand, in the case where the drive electrode 21 is driven by operating the magnetic field generation source 6, the input device 3 side resonates, and the detection value increases.

In the present embodiment, by using the fact that different detection values are obtained between the touch detection operation in which the magnetic field generation source 6 is operated and the touch detection operation in which the magnetic field generation source 6 is not operated as described above, the initial state of the input device 3 (the initial positions of the conductive materials 31a and 31b) is detected when the power of the touch panel 2 (the display device DSP on which the sensor device 1 is mounted) is turned on.

Hereinafter, an example of a processing procedure of the sensor controller 4 when an operation of a user is detected will be described with reference to a flowchart in FIG. 16. The process illustrated in FIG. 16 is executed when the power of the touch panel 2 is turned on. Hereinafter, the process illustrated in FIG. 16 is referred to as a first process of the sensor controller 4 for convenience.

When the power of the touch panel 2 is turned on, the sensor controller 4 performs a baseline detection operation (step S1). In the baseline detection operation, by applying a voltage (drive voltage) to each of the plurality of drive electrodes 21 included in the touch panel 2 without operating the magnetic field generation source 6, a detection value in each drive electrode 21 is acquired as a baseline.

When the process of step S1 is executed, the sensor controller 4 performs a touch detection operation (step S2). In the touch detection operation, the magnetic field generation source 6 is operated to apply a voltage (drive voltage) to each of the plurality of drive electrodes 21 included in the touch panel 2, whereby a detection value (hereinafter, referred to as a detection line) in each drive electrode 21 is acquired.

Next, the sensor controller 4 calculates a difference (Diff) between the detection line acquired by executing the process of step S2 and the baseline acquired by executing the process of step S1.

Here, as described above, in the case where the input device 3 is disposed on the touch panel 2 at the time when the power of the touch panel 2 is turned on, the detection value (detection value in each of the drive electrodes 21 disposed at the positions facing the conductive materials 31a and 31b) acquired in the baseline detection operation in which the magnetic field generation source 6 is not operated is different from the detection value (detection value in each of the drive electrodes 21 disposed at the positions facing the conductive materials 31a and 31b) acquired in the touch detection operation in which the magnetic field generation source 6 is operated.

For this reason, in the present embodiment, by calculating the difference between the detection line and the baseline as described above, the positions of the drive electrodes 21 where different detection values are acquired between the case where the baseline detection operation is performed and the case where the touch detection operation is performed can be detected as the positions of the conductive materials 31a and 31b. In this case, for example, the positions of the drive electrodes 21 where the detection values in which the difference is equal to or larger than a predetermined value (hereinafter, referred to as a threshold) are acquired are detected. The positions of the conductive materials 31a and 31b detected in this manner are represented by coordinate values on the touch panel 2 (touch detection area 2a).

Here, the sensor controller 4 determines whether or not the difference between the detection line and the baseline calculated as described above is equal to or larger than a threshold (that is, whether or not the input device 3 is disposed on the touch panel 2) (step S3).

When it is determined that the difference is equal to or larger than the threshold (YES in step S3), the sensor controller 4 detects the positions of the drive electrodes 21 (that is, the positions of the conductive materials 31a and 31b included in the input device 3) where the detection values in which the difference is equal to or larger than the threshold are acquired, and outputs the positions (coordinate values) to, for example, the host device 10 (step S4). When the process of step S4 is executed, the process returns to step S2 and the process is repeated.

Here, the baseline described above is necessary for detecting an object in contact with or in proximity to the touch panel 2, but there is a possibility that the detection value (detection line) in the touch detection operation changes according to, for example, a change in environment. For this reason, it is preferable that the baseline compared with the detection line is periodically updated.

For this reason, when it is determined in step S3 that the difference is not equal to or larger than the threshold value (NO in step S3), the sensor controller 4 updates the baseline detected in step S1 (step S5). In this case, the sensor controller 4 sets the detection line acquired by executing the process of step S2 as the baseline. When the process of step S5 is executed, the process returns to step S2 described above, and the process is repeated.

Assuming that the detection line is a baseline when the input device 3 is detected, for example, in a case where the input device 3 is not operated (that is, the positions of the conductive materials 31a and 31b do not change), the detection line similar to the baseline is acquired, and the positions of the conductive materials 31a and 31b cannot be detected from the difference.

For this reason, when it is determined in step S3 described above that the difference is equal to or larger than the threshold, the process of step S5 (that is, the update process of the baseline) is not executed.

Here, the description has been mainly given assuming that the initial state of the input device 3 is detected when the power of the touch panel 2 is turned on. However, for example, after the process of step S21 is executed, it is also possible to detect the position (contact position) of the user's finger with respect to the input device outer area 2c (area other than the input device area 2b).

That is, even in a case where the user's finger operates the touch panel 2 (input device outer area 2c), the difference between the detection line and the baseline is equal to or larger than the threshold, and the position of the user's finger is detected.

According to this, in the first process of the sensor controller 4 illustrated in FIG. 16, the process of step S4 is executed in a case where the position of at least one of the input device 3 (conductive materials 31a and 31b) and the user's finger is detected (that is, the difference between the detection line and the baseline is equal to or larger than the threshold), and the process of step S5 is executed in a case where the position of neither the input device 3 nor the user's finger is detected (that is, the difference between the detection line and the baseline is not equal to or larger than the threshold).

The first process of the sensor controller 4 described above is continuously repeated until the power of the touch panel 2 (the display device DSP on which the sensor device 1 is mounted) is turned off.

Here, although the process related to the touch detection operation of detecting an operation of the user has been mainly described in FIG. 16, the sensor controller 4 also performs a display/write operation (operation of displaying an image) in addition to the touch detection operation.

In this case, the sensor controller 4 can perform the display/write operation and the touch detection operation in a time division manner. According to this, as shown in FIG. 17, a period during which the display/write operation is performed (display period) and a period during which the touch detection operation is performed (touch detection period) are alternately provided.

Figure 17:
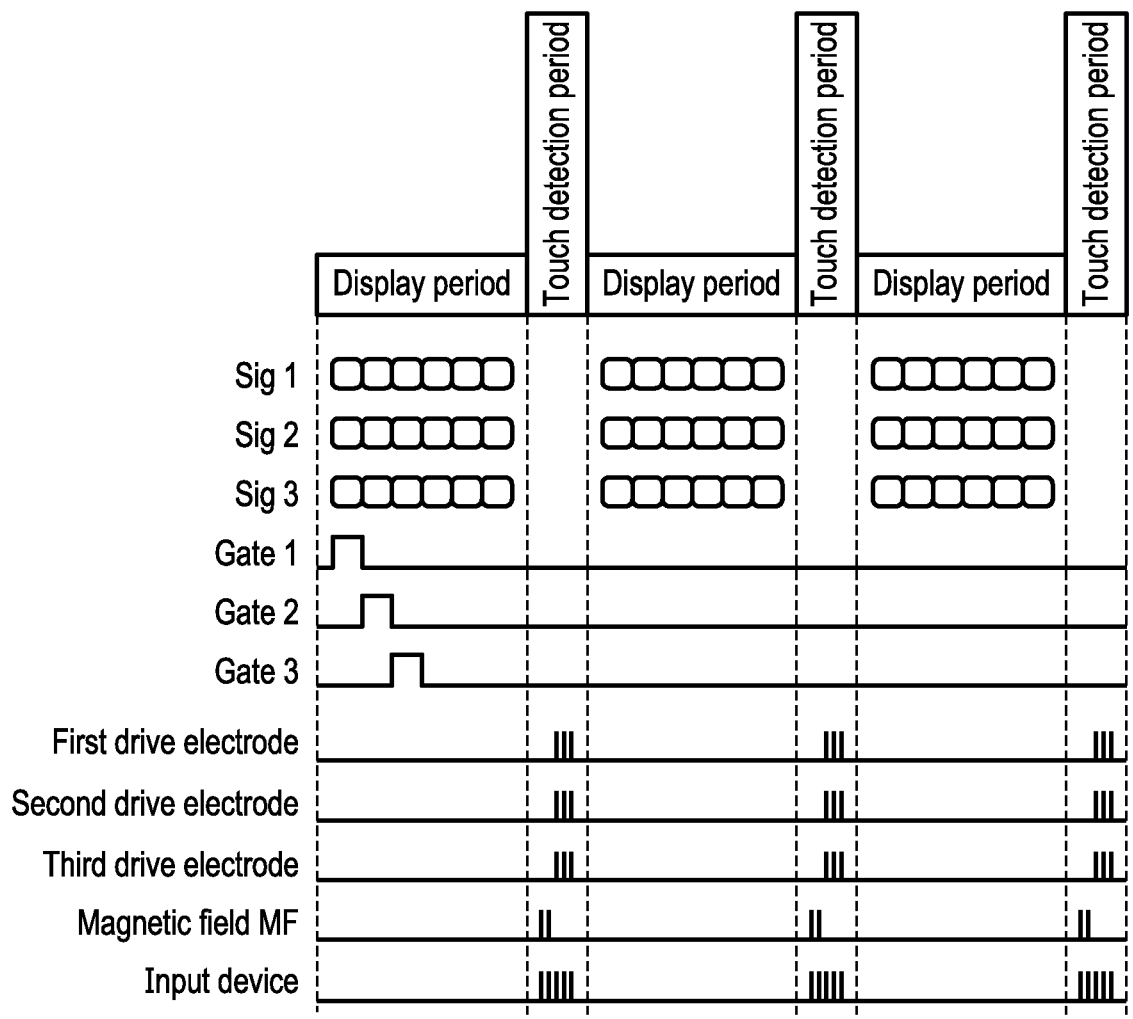
FIG. 17 is a diagram for explaining that a display/write operation and a touch detection operation are performed in a time division manner.

Although only three are illustrated in FIG. 17 for convenience, Sig indicates an image signal written in each of a plurality of pixels in the display period, and Gate indicates a gate signal supplied to the plurality of pixels (pixel switches) in which the image signal is written in the display period. The image signal Sig and the gate signal Gate are supplied in units of display lines. Further, in the present embodiment, since resonance is not affected even when the plurality of drive electrodes 21 are simultaneously driven, as illustrated in FIG. 17, first to third drive electrodes 21 may be simultaneously driven in each touch detection period.

Figure 18:
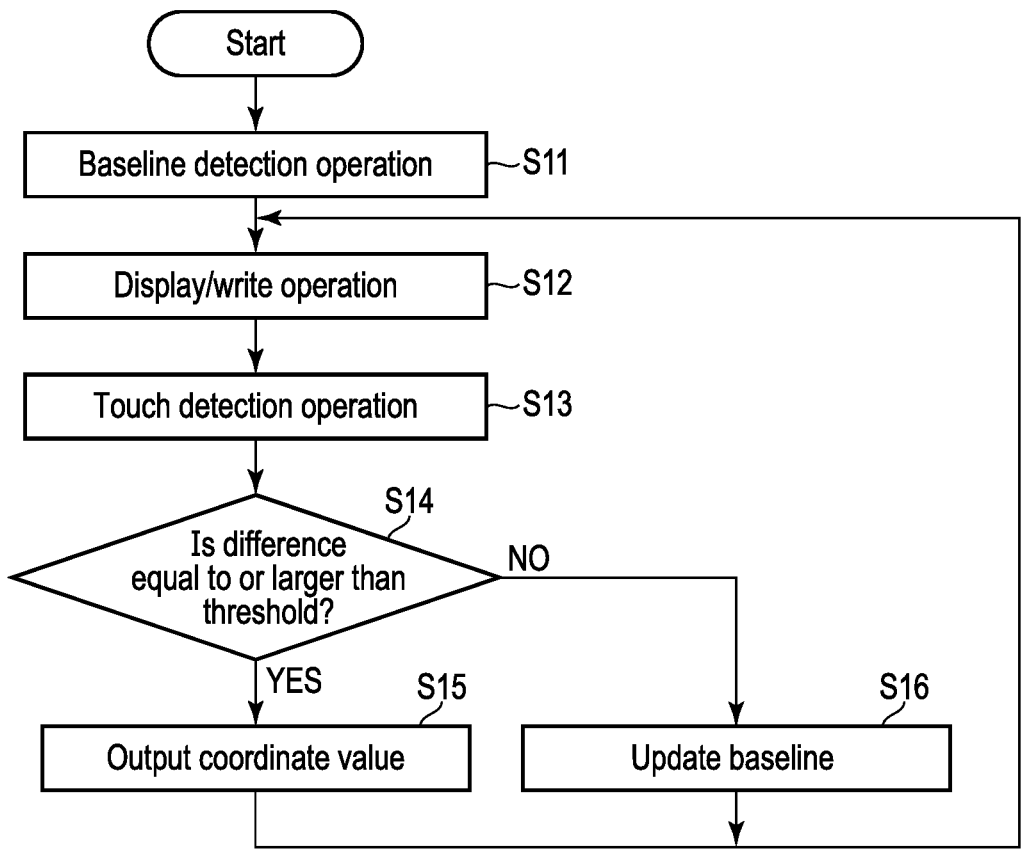
FIG. 18 is a flowchart illustrating an example of a second process of the sensor controller.

An example of a processing procedure of the sensor controller 4 in a case where the display/write operation and the touch detection operation are performed in a time division manner as described above will be described with reference to a flowchart in FIG. 18. Here, differences from the process illustrated in FIG. 16 referred to above will be mainly described. In the following description, the process illustrated in FIG. 18 is referred to as a second process of the sensor controller 4 for convenience.

When the power of the touch panel 2 is turned on, the process of step S11 corresponding to the process of step S1 illustrated in FIG. 16 referred to above is executed.

Next, the sensor controller 4 performs a display/write operation (step S12). Though detailed explanations are omitted here, in the display/write operation, for example, an image signal (pixel signal) is written in each of a plurality of pixels disposed in a display area of the display device DSP, whereby an image is displayed in the display area.

When the process of step S12 is executed, the processes of steps S13 to S16 corresponding to the processes of steps S2 to S5 illustrated in FIG. 16 are executed.

When the process of step S15 or S16 is executed, the process returns to step S12 and the process is repeated.

In a case where the display/write operation and a touch detection operation are performed in a time division manner as described above, for example, each of the plurality of drive electrodes 21 can be used also as an electrode for image display (common electrode), so that it is possible to realize slimness of the display device DSP, and the like.

Here, as described above, it is preferable that the baseline is periodically updated. However, in the processes illustrated in FIGS. 16 and 18 (the first process and the second process of the sensor controller 4), when the state in which the input device 3 is disposed on the touch panel 2 is maintained, the baseline cannot be updated. Since it is also assumed that the input device 3 is continuously used (operated) for a long time, a mechanism for updating the baseline is useful even in a state where the input device 3 is disposed on the touch panel 2.

Figure 19:
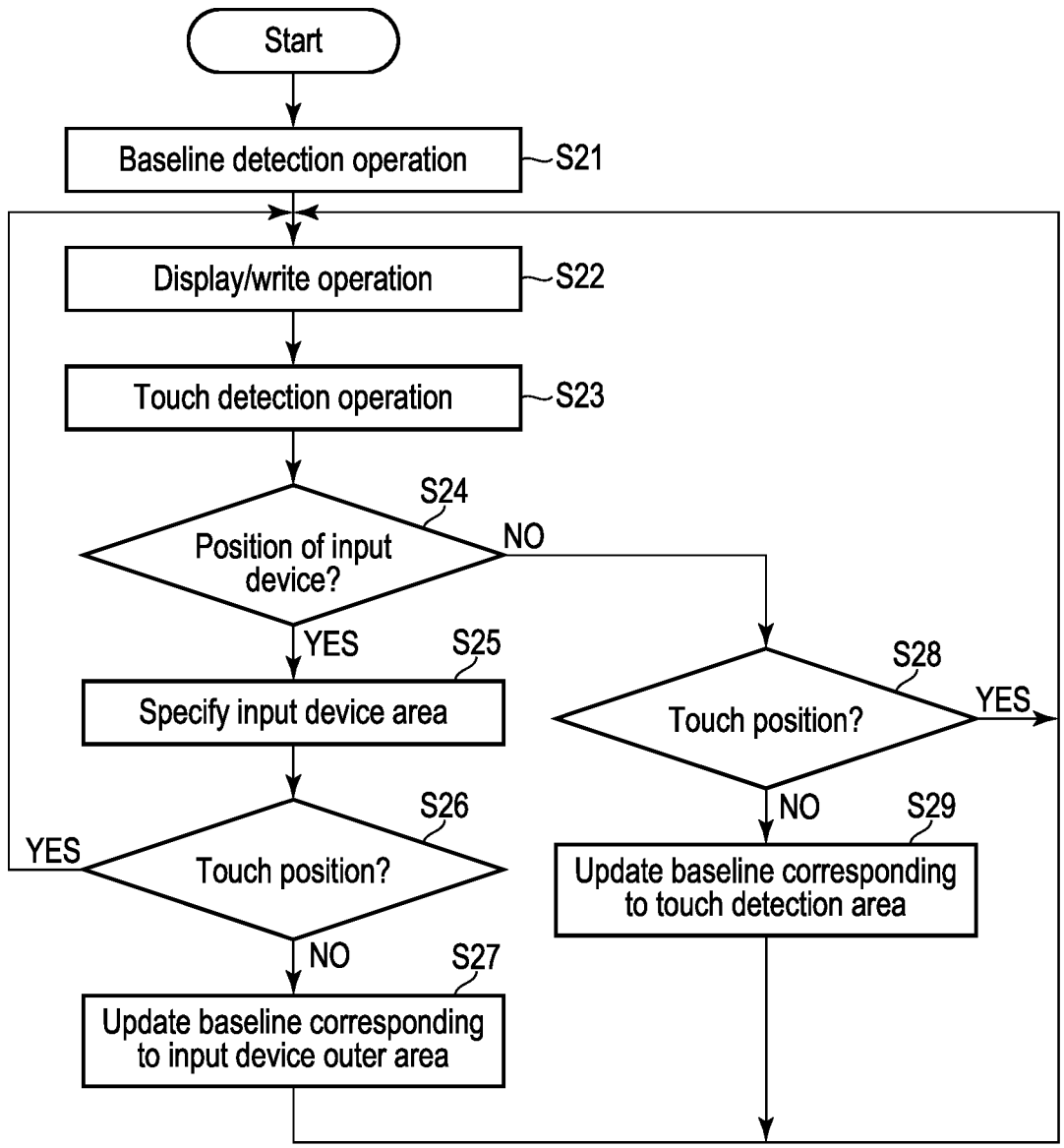
FIG. 19 is a flowchart illustrating an example of a third process of the sensor controller.

Hereinafter, an example of a processing procedure of the sensor controller 4 for updating the baseline in a case where the input device 3 is disposed on the touch panel 2 will be described with reference to a flowchart in FIG. 19. Here, differences from the process illustrated in FIG. 16 referred to above will be mainly described. In the following description, the process illustrated in FIG. 19 is referred to as a third process of the sensor controller 4 for convenience.

When the power of the touch panel 2 is turned on, the processes of steps S21 to S23 corresponding to the processes of steps S11 to S13 illustrated in FIG. 18 referred to above are executed.

When the process of step S23 is executed, the difference between the detection line and the baseline is calculated as described above, and the positions of the conductive materials 31a and 31b provided in the input device 3 or the position of the user's finger can be detected based on the difference.

Here, since the detection values in the drive electrodes 21 disposed at the positions facing the conductive materials 31a and 31b are based on resonance in the resonant circuit, the detection values are different from the detection value in the drive electrode 21 disposed at the position facing the user's finger. For this reason, the sensor controller 4 can determine whether the positions of the conductive materials 31a and 31b (hereinafter, referred to as a position of the input device 3) have been detected or the position of the user's finger (hereinafter, referred to as a touch position) has been detected based on the difference between the detection line and the baseline described above. Whether the position of the input device 3 has been detected or the touch position has been detected may be determined by, for example, a pattern of the detection value or the like.

Therefore, when the process of step S23 is executed, the sensor controller 4 determines whether or not the position of the input device 3 has been detected (step S24).

When it is determined that the position of the input device 3 has been detected (YES in step S24), the sensor controller 4 specifies an area on the touch panel 2 where the input device 3 is disposed (that is, the input device area 2b) (step S25). Here, since the positions (coordinate values) of the conductive materials 31a and 31b included in the input device 3 are detected, the coordinate values and the like of the area occupied by the input device 3 on the touch panel 2 when the conductive materials 31a and 31b are disposed at the positions on the touch panel 2 corresponding to the coordinate values are specified as the input device area 2b.

Next, the sensor controller 4 determines whether or not the touch position has been detected (step S26).

When it is determined that the touch position has not been detected (NO in step S26), the sensor controller 4 updates the baseline corresponding to the input device outer area 2c (step S27).

In this case, the sensor controller 4 specifies an area excluding the input device area 2b specified in step S25 described above from the touch detection area 2a as the input device outer area 2c. The sensor controller 4 sets, as a baseline corresponding to the input device outer area 2c, the detection value in the drive electrode 21 disposed at a position overlapping the input device outer area 2c (that is, the detection line corresponding to the input device outer area 2c) among the detection values acquired by executing the process of step S23.

When the process of step S27 is executed, the baseline corresponding to the input device outer area 2c is updated, but the baseline corresponding to the input device area 2b is not updated.

When the process of step S27 is executed, the process returns to step S22 and the process is repeated. On the other hand, when it is determined that the touch position has been detected (YES in step S26), the process of step S27 is not executed, and the process returns to step S22 and the process is repeated.

When it is determined in step S24 described above that the position of the input device 3 has not been detected (NO in step S24), the sensor controller 4 determines whether or not the touch position has been detected (step S28).

When it is determined that the touch position has not been detected (NO in step S28), the sensor controller 4 updates the baseline corresponding to the entire touch detection area 2a (step S29). The process of step S29 corresponds to the process of step S16 illustrated in FIG. 18 (step S5 illustrated in FIG. 16) referred to above, and the sensor controller 4 sets the detection line acquired by executing the process of step S23 as the baseline. When the process of step S29 is executed, the process returns to step S22 and the process is repeated.

When it is determined in step S28 that the touch position has been detected (YES in step S28), the process returns to step S22 and the process is repeated.

According to the third process of the sensor controller 4 illustrated in FIG. 19 referred to above, even in a case where the position of the input device 3 is detected (that is, the input device 3 is disposed on the touch panel 2), when the touch position is not detected, the baseline corresponding to the input device outer area 2c can be updated. When both the position of the input device 3 and the touch position are not detected, the baseline corresponding to the touch detection area 2a is updated.

According to this, by distinguishing the update of the baseline between the area where the input device 3 is disposed (input device area 2b) and the area other than the area (input device outer area 2c), the baseline corresponding to the area where the touch position (that is, the position of the user's finger) is detected can be updated even when the input device 3 is continuously disposed.

Although not illustrated in FIG. 19, the position of the input device 3 (conductive materials 31a and 31b) or the touch position detected by executing the process of step S23 is output to the host device 10 or the like at an optional timing, for example.

Here, when the third process of the sensor controller 4 described above is executed, it is possible to update the baseline corresponding to the input device outer area 2c, but it is not possible to update the baseline corresponding to the input device area 2b while the input device 3 is continuously disposed.

Figure 20:
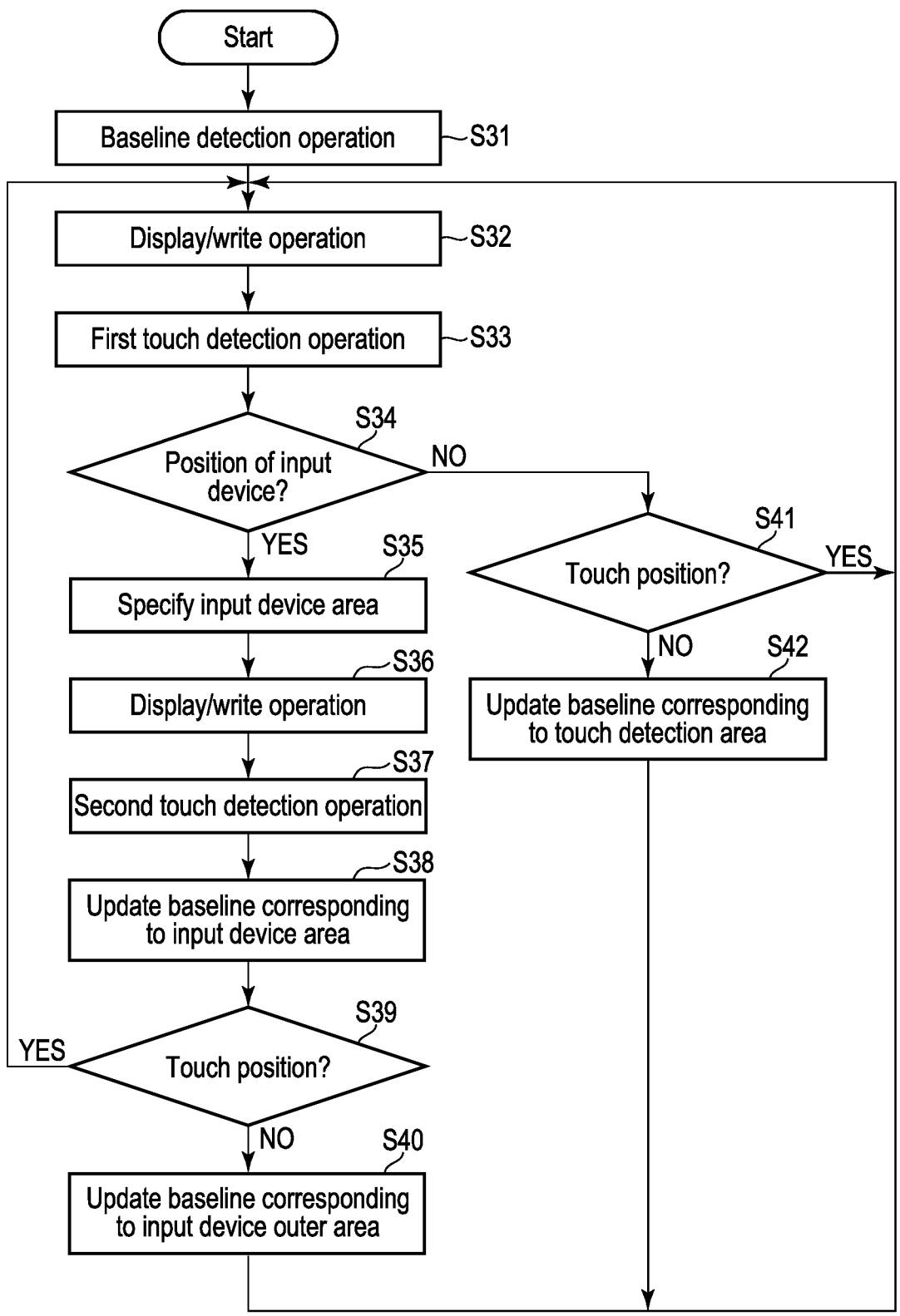
FIG. 20 is a flowchart illustrating an example of a fourth process of the sensor controller.

Hereinafter, an example of a processing procedure of the sensor controller 4 for updating the baseline corresponding to the input device area 2b will be described with reference to a flowchart in FIG. 20. Here, differences from the process illustrated in FIG. 19 referred to above will be mainly described. In the following description, the process illustrated in FIG. 20 is referred to as a fourth process of the sensor controller 4 for convenience.

When the power of the touch panel 2 is turned on, the processes of steps S31 to S35 corresponding to the processes of steps S21 to S25 illustrated in FIG. 19 referred to above are executed. In the description in FIG. 20, a touch detection operation performed in step S33 is referred to as a first touch detection operation for convenience.

When the process of step S35 is executed, the sensor controller 4 performs a display/write operation (step S36). The process of step S36 is similar to the process of step S32.

Next, the sensor controller 4 performs a second touch detection operation (step S37). In the first touch detection operation in step S33 described above, the magnetic field generation source 6 is operated to drive each of the plurality of drive electrodes 21, but in the second touch detection operation in step S37, each of the plurality of drive electrodes 21 is driven without operating the magnetic field generation source 6. As a result, the sensor controller 4 acquires a detection value in each drive electrode 21 driven without operating the magnetic field generation source 6 as a detection line.

In a case where the second touch detection operation is performed, the touch position can be detected based on a difference between the detection line acquired by executing the process of step S37 and the baseline acquired by executing the process of step S31. On the other hand, since the plurality of drive electrodes 21 are driven without operating the magnetic field generation source 6 in a baseline detection operation and the second touch detection operation, the position of the input device 3 cannot be detected in the second touch detection operation.

When the process of step S37 is executed, the sensor controller 4 updates the baseline corresponding to the input device area 2b (step S38). In this case, the sensor controller 4 sets, as a baseline corresponding to the input device area 2b, the detection value in the drive electrode 21 disposed at a position overlapping the input device area 2b (that is, the detection line corresponding to the input device area 2b) specified in step S35 among the detection values acquired by executing the process of step S37.

Next, the processes of steps S39 and S40 corresponding to the processes of steps S26 and S27 illustrated in FIG. 19 are executed. The input device outer area 2c in step S40 is an area excluding the input device area 2b specified in step S35 from the touch detection area 2a.

When it is determined in step S39 that the touch position has been detected (YES in step S39), the process of step S40 is not executed, and the process returns to step S32 and the process is repeated. When step S40 is executed, the process returns to step S32 and the process is repeated.

When it is determined in step S34 described above that the position of the input device 3 has not been detected (NO in step S34), the processes of steps S41 and S42 corresponding to the processes of steps S28 and S29 illustrated in FIG. 19 are executed.

When it is determined in step S41 that the touch position has been detected (YES in step S41) or when the process of step S42 has been executed, the process returns to step S32 and the process is repeated.

According to the fourth process of the sensor controller 4 illustrated in FIG. 20 referred to above, when the position of the input device 3 is detected (that is, the input device 3 is disposed on the touch panel 2), the baseline corresponding to the input device area 2b is updated by the detection value (detection line) acquired by driving the plurality of drive electrodes 21 without operating the magnetic field generation source 6.

That is, by performing the touch detection operation separately for the drive to cause resonance and the drive not to cause resonance, it is possible to update the baseline corresponding to the input device area 2b even in a case where the input device 3 is continuously disposed.

The example illustrated in FIG. 20 illustrates a case where the first touch detection operation of operating the magnetic field generation source 6 and the second touch detection operation of not operating the magnetic field generation source 6 are alternately performed. However, for example, one second touch detection operation (update of the baseline) may be performed for n (n is an integer of 2 or more) times of first touch detection operations (position detection of the input device 3). As described above, since the position of the input device 3 can be detected during the first touch detection operation, and the touch position can be detected during the first touch detection operation and the second touch detection operation, the report rate of the position detection of the input device 3 in this case is n/(n+1) of the detection of the touch value.

Figure 21:
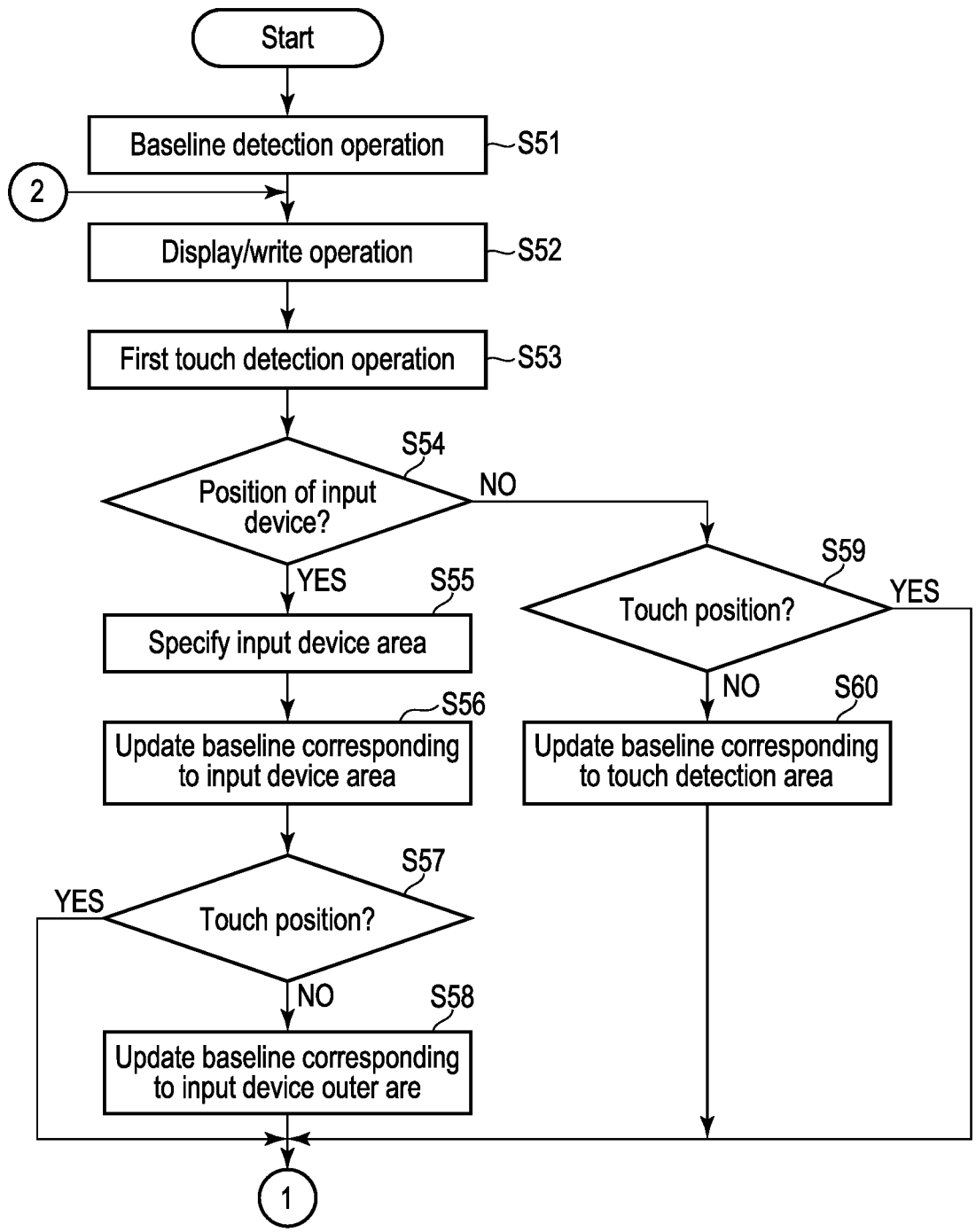
FIG. 21 is a flowchart illustrating an example of a fifth process of the sensor controller.
Figure 22:
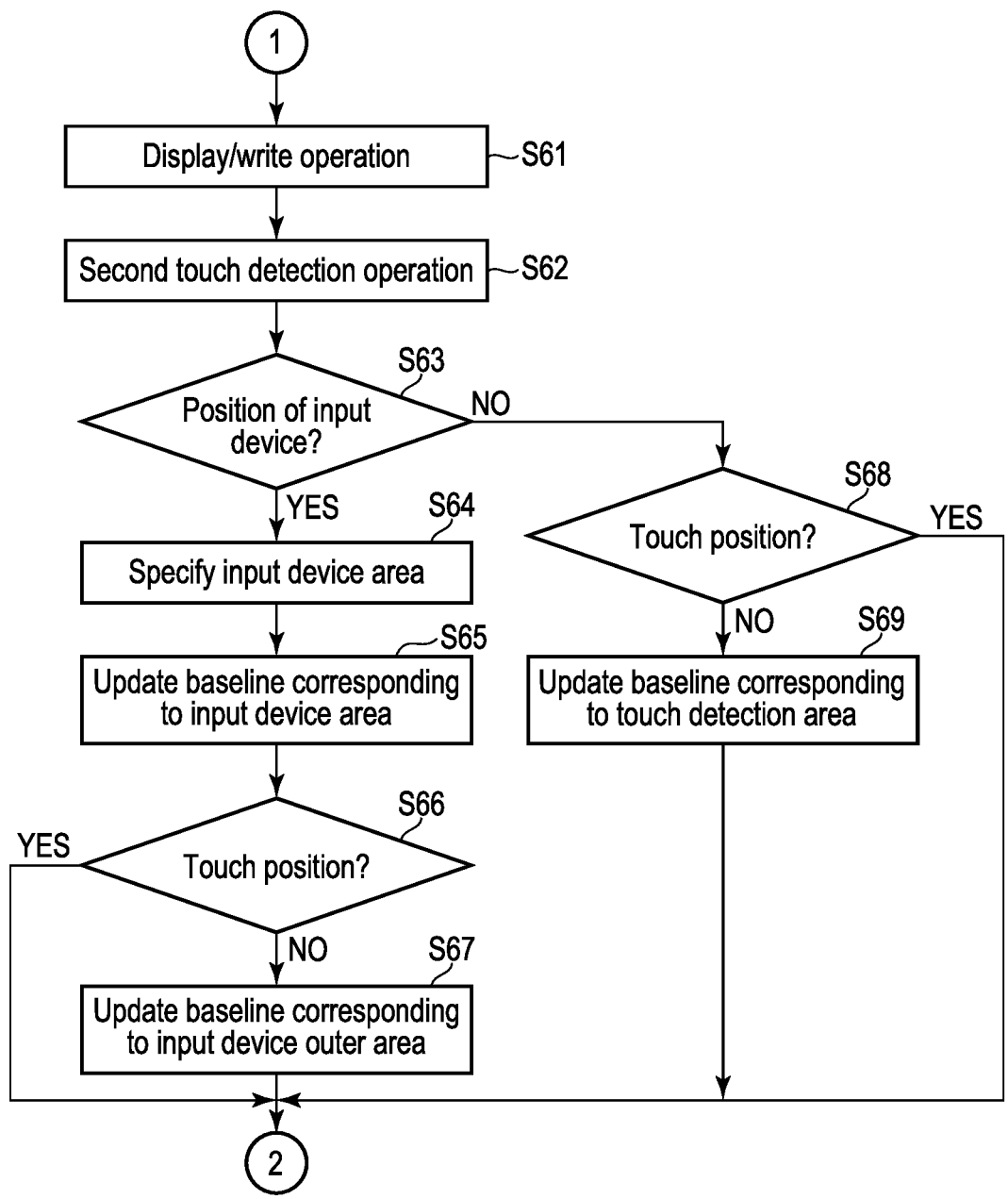
FIG. 22 is a flowchart illustrating the example of the fifth process of the sensor controller.

Further, another example of a processing procedure of the sensor controller 4 for updating the baseline corresponding to the input device area 2b will be described with reference to flowcharts in FIGS. 21 and 22. Here, differences from the process illustrated in FIG. 19 will be mainly described. In the following description, the process illustrated in FIGS. 21 and 22 is referred to as a fifth process of the sensor controller 4 for convenience.

When the power of the touch panel 2 is turned on, the processes of steps S51 to S55 corresponding to the processes of steps S21 to S25 illustrated in FIG. 19 referred to above are executed. In the descriptions in FIGS. 21 and 22, the touch detection operation performed in step S53 is referred to as a first touch detection operation for convenience.

When the process of step S55 is executed, the sensor controller 4 updates the baseline corresponding to the input device area 2b (step S56). In this case, the sensor controller 4 sets, as a baseline corresponding to the input device area 2b, the detection value in the drive electrode 21 disposed at a position overlapping the input device area 2b (that is, the detection line corresponding to the input device area 2b) specified in step S55 among the detection values acquired by executing the process of step S53.

When the process of step S56 is executed, the processes of steps S57 and S58 corresponding to the processes of steps S26 and S27 illustrated in FIG. 19 are executed. When it is determined in step S57 that the touch position has been detected (YES in step S57) or when the process of step S58 has been executed, the process of step S61 below is executed.

Next, the sensor controller 4 performs a display/write operation (step S61). the process of step S61 is similar to the process of step S52.

When the process of step S61 is executed, the sensor controller 4 performs a second touch detection operation (step S62). The second touch detection operation in step S62 is similar to the second touch detection operation described with reference to FIG. 20 referred to above. That is, in the second touch detection operation in step S62, each of the plurality of drive electrodes 21 is driven without operating the magnetic field generation source 6, and the detection value in each drive electrode 21 is acquired as a detection line.

Here, for example, when it is determined in step S54 described above that the position of the input device 3 has been detected (that is, the input device 3 is disposed on the touch panel 2), the baseline corresponding to the input device area 2b at the time when the process of step S62 is executed is the detection value acquired in the first touch detection operation in step S53 (that is, the detection value when the magnetic field generation source 6 is operated).

On the other hand, in the second touch detection operation in step S62, a detection value when the magnetic field generation source 6 is not operated is acquired as a detection line.

In this case, for example, even when the positions of the conductive materials 31a and 31b included in the input device 3 are changed (that is, the input device 3 is operated), or even when the positions of the conductive materials 31a and 31b are maintained (that is, the input device 3 is not operated), the positions of the conductive materials 31a and 31b can be detected by calculating the difference between the detection line and the baseline corresponding to the input device area 2b.

For this reason, the sensor controller 4 can determine whether the position of the input device 3 (that is, the positions of the conductive materials 31a and 31b) has been detected (step S63).

When it is determined that the position of the input device 3 has been detected (YES in step S63), the processes of steps S64 to S67 corresponding to the processes of steps S55 to S58 described above are executed. When it is determined in step S66 that the touch position has been detected (YES in step S66) or when the process of step S67 has been executed, the process returns to step S52 and the process is repeated. On the other hand, when it is determined in step S63 that the position of the input device 3 has not been detected (NO in step S63), the processes of steps S68 and S69 corresponding to the processes of steps S59 and S60 described above are executed. When it is determined in step S68 that the touch position has been detected (YES in step S68) or when the process of step S69 has been executed, the process returns to step S52 and the process is repeated.

According to the fifth process of the sensor controller 4 illustrated in FIGS. 21 and 22 referred to above, the first touch detection operation of operating the magnetic field generation source 6 and the second touch detection operation of not operating the magnetic field generation source 6 are alternately performed, and the difference from the previous frame is detected, so that the update of the baseline regarding the input device area 2b and the position detection of the input device 3 (conductive materials 31a and 31b) can be achieved together.

Here, in FIGS. 21 and 22, the processing in consideration of the case of detecting the touch position (that is, the contact position of the user's finger) on the touch panel 2 has been described, but in a case where the detection of the touch position is not considered, a simpler processing may be performed.

Figure 23:
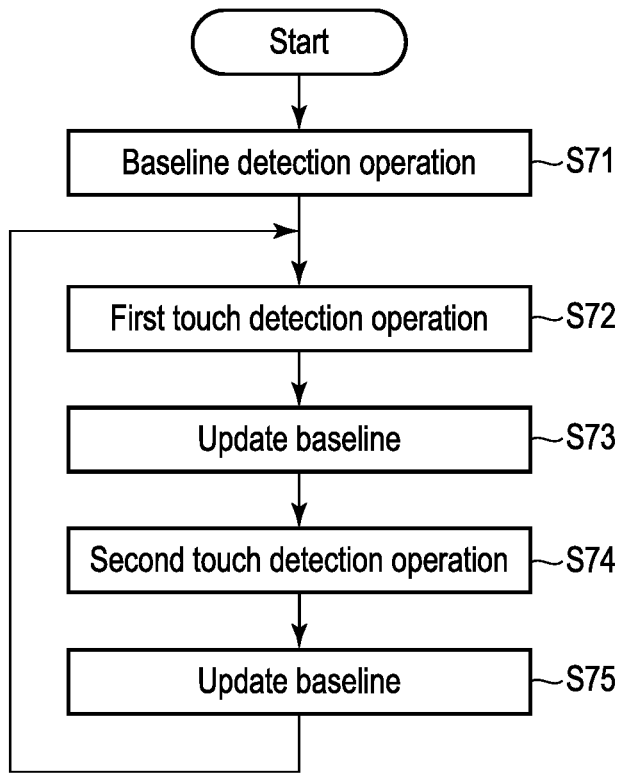
FIG. 23 is a flowchart illustrating an example of a sixth process of the sensor controller.

FIG. 23 illustrates an example of a processing procedure of the sensor controller 4 in a case where detection of a touch position is not considered. In the following description, the process illustrated in FIG. 23 is referred to as a sixth process of the sensor controller 4 for convenience. The sixth process of the sensor controller 4 will be briefly described.

First, the sensor controller 4 performs a baseline detection operation (step S71). According to this baseline detection operation, a detection value in each drive electrode 21 when the magnetic field generation source 6 is not operated is acquired as a baseline.

Next, the sensor controller 4 performs a first touch detection operation (step S72). According to the first touch detection operation, a detection value in each drive electrode 21 when the magnetic field generation source 6 is operated is acquired as a detection line.

Here, since the baseline acquired by executing the process of step S71 is a detection value when the magnetic field generation source 6 is not operated, and the detection line acquired by executing the process of step S72 is a detection value when the magnetic field generation source 6 is operated, the position of the input device 3 (conductive materials 31a and 31b) can be detected by calculating a difference between the baseline and the detection line.

When the process of step S72 is executed, the sensor controller 4 updates the baseline acquired by executing the process of step S71 based on the detection line acquired by executing the process of step S72 described above (step S73).

Next, the sensor controller 4 performs a second touch detection operation (step S74). According to the second touch detection operation, a detection value in each drive electrode 21 when the magnetic field generation source 6 is not operated is acquired as a detection line.

Here, since the baseline updated in step S73 is a detection value when the magnetic field generation source 6 is operated, and the detection line acquired by executing the process of step S74 is a detection value when the magnetic field generation source 6 is not operated, the position of the input device 3 (conductive materials 31a and 31b) can be detected by calculating a difference between the baseline and the detection line.

When the process of step S74 is executed, the sensor controller 4 further updates the baseline updated in step S73 based on the detection line acquired by executing the process of step S74 described above (step S75). When the process of step S75 is executed, the process returns to step S72 and the process is repeated.

When the detection of the touch position by the user's finger is not considered, as illustrated in FIG. 23, the first touch detection operation of operating the magnetic field generation source 6 and the second touch detection operation of not operating the magnetic field generation source 6 may be alternately performed, and the baseline may be updated with the detection value (detection line) acquired in the touch detection operation.

Although the first to sixth processes have been described as the processes of the sensor controller 4 in the present embodiment, the sensor controller 4 may execute at least one of the first to sixth processes. In addition, which of the first to sixth processes is to be executed may be determined based on, for example, specifications, performance, or the like of the display device DSP (or the sensor device 1). Furthermore, the first to sixth processes of the sensor controller 4 may be executed in combination as appropriate.

As described above, in the present embodiment, the resonant circuit including the conductive materials 31*a* and 31*b* (first and second conductive materials) is provided inside the input device 3, and the conductive materials 31*a* and 31*b* are capacitively coupled to at least one of the plurality of drive electrodes 21 included in the touch panel 2 when the input device 3 is disposed on the touch panel 2 or when the input device 3 disposed on the touch panel 2 is operated. Further, in the present embodiment, the resonant circuit is electromagnetically coupled to the magnetic field generation source 6 so as to resonate based on the magnetic field generated by the magnetic field generation source 6 when the input device 3 is disposed on the touch panel 2 or when the input device 3 disposed on the touch panel 2 is operated. In the present embodiment, the sensor controller 4 detects the positions (coordinate positions) of the conductive materials 31*a* and 31*b* on the touch panel 2 by applying a voltage to each of the plurality of electrodes 21 included in the touch panel 2 according to the operation of the magnetic field generation source 6.

In this case, for example, the position of the conductive material 31*a* is detected by applying a voltage to the drive electrode 21 facing the conductive material 31*a*, and the position of the conductive material 31*b* is detected by applying a voltage to the drive electrode 21 facing the conductive material 31*b*. The resonant circuit in the present embodiment is configured as a circuit in which the inductor L and the capacitor C are connected in parallel between the conductive materials 31*a* and 31*b*.

In the present embodiment, with such a configuration, it is possible to increase the detection value for detecting the physical state of the input device 3, and thus, it is possible to suppress error detection on the input device 3 and to detect the operation of the user on the input device 3 disposed on the touch panel 2 with high accuracy.

When the input device 3 in the present embodiment is configured as a knob (input device 3*a* shown in FIG. 1), the positions of the conductive materials 31*a* and 31*b* when the knob disposed on the touch panel 2 is rotated can be detected (that is, the operation of the user rotating the knob can be detected).

In the present embodiment, the description has been mainly given assuming that the input device 3 is a knob, but the input device 3 may be, for example, a finger grip (input device 3*b* illustrated in FIG. 1), a button (input device 3*c* illustrated in FIG. 1), a slider (input device 3*d* illustrated in FIG. 1), or the like.

Figure 24:
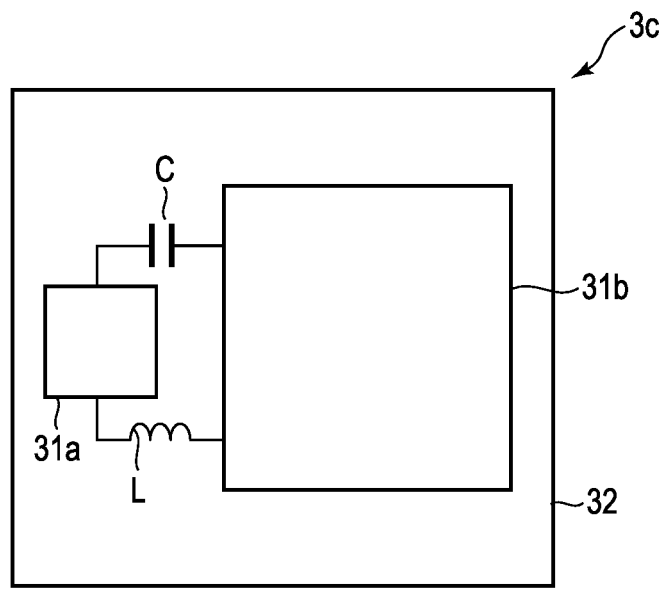
FIG. 24 is a diagram illustrating a planar structure of another example of the input device.

Here, FIG. 24 illustrates an example of a planar structure of the input device 3*c* (button). As illustrated in FIG. 24, a resonant circuit (LC circuit) including conductive materials 31*a* and 31*b*, an inductor L, and a capacitor C is provided inside the input device 3*c* (non-conductive material 32). The input device 3 is configured such that the conductive materials 31*a* and 31*b* are brought into contact with or close to the touch panel 2 (that is, each of the conductive materials 31*a* and 31*b* is capacitively coupled to at least one of the plurality of drive electrodes 21, and the resonant circuit resonates by electromagnetic coupling) when the input device 3 is pressed. Accordingly, by detecting the positions of the conductive materials 31*a* and 31*b* when the input device 3*c* is pressed, it is possible to detect an operation of the user pressing the input device 3*c* (button).

Figure 25:
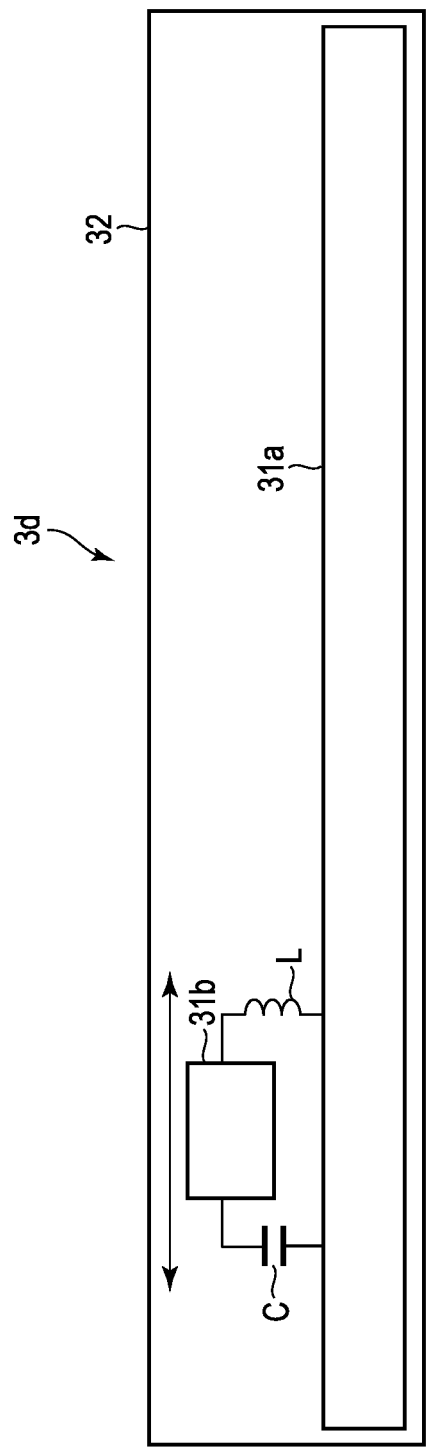
FIG. 25 is a diagram illustrating a planar structure of another example of the input device.

In addition, FIG. 25 illustrates an example of a planar structure of the input device 3*d* (slider). As illustrated in FIG. 25, a resonant circuit (LC circuit) including conductive materials 31*a* and 31*b*, an inductor L, and a capacitor C is provided inside the input device 3*d* (non-conductive material 32). Further, the input device 3*d* is configured to be able to slide the second member along the first member formed to be elongated unidirectionally. In this case, the conductive material 31*a* is disposed inside the first member, and the conductive material 31*b* is disposed inside the second member. Further, the conductive materials 31*a* and 31*b* are in contact with or in proximity to the touch panel 2 while the input device 3*d* is disposed on the touch panel 2. According to this, by detecting the positions of the conductive materials 31*a* and 31*b* when the second member is slid along the first member, it is possible to detect an operation of the user sliding the second member.

Here, the input devices 3*c* (button) and 3*d* (slider) have been described, and the input device 3*b* (finger grip) has an internal structure substantially similar to that of the input device 3*a* although the shape and size of the non-conductive material 32 are different. Accordingly, it is possible to detect an operation of the user rotating the input device 3*b* (finger grip).

Figure 26:
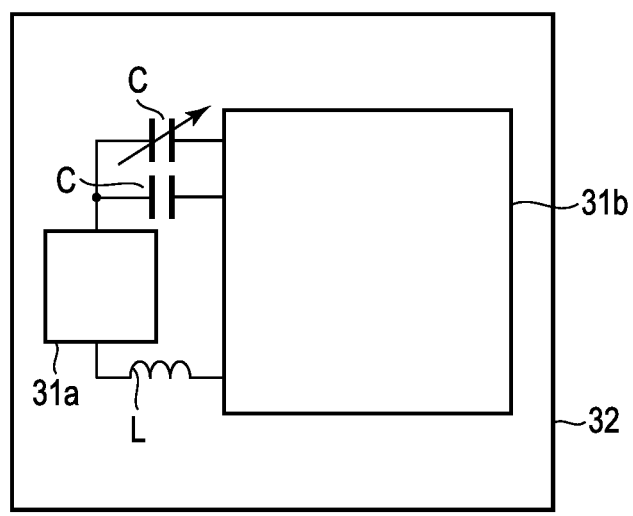
FIG. 26 is a diagram illustrating another example of the resonant circuit provided inside the input device.

For example, a resonant circuit including a plurality of capacitors C as illustrated in FIG. 26 may be provided inside the input device 3. According to such an input device 3, for example, when an operation is performed on the input device 3, a change in resonance due to a change in the circuit inside the input device 3 (for example, two points in the circuit are short-circuited and the circuit becomes not a resonant circuit, or the capacitance or the induction changes and the resonance frequency changes) can be detected as an operation of the user. Although FIG. 26 illustrates a case where the input device 3 is a button, the configuration illustrated in FIG. 26 may be applied to an input device other than the button.

In the present embodiment, the input device 3 disposed on the touch panel 2 may be other than the above-described input devices 3*a* to 3*d* as long as a resonant circuit including the conductive materials 31*a* and 31*b* described above is provided therein.

Further, in the present embodiment, when the power of the touch panel 2 is turned on, a voltage is applied to each of the plurality of drive electrodes 21 included in the touch panel 2 without operating the magnetic field generation source 6, thereby acquiring a baseline (first detection value in each of the plurality of drive electrodes 21). The magnetic field generation source 6 is operated to apply a voltage to each of the plurality of drive electrodes 21 included in the touch panel 2, thereby acquiring a detection line (second detection value in each of the plurality of drive electrodes 21). In the present embodiment, the positions of the conductive materials 31*a* and 31*b* are detected by comparing the baseline with the detection line.

In the present embodiment, with such a configuration, it is possible to detect an initial state (initial positions of the conductive materials 31*a* and 31*b*) of the input device 3 when the power of the touch panel 2 (display device DSP) is turned on (that is, at the time of startup), and to detect an operation of the user based on a change in the positions of the conductive materials 31*a* and 31*b* from the initial state.

Further, in the present embodiment, the plurality of drive electrodes 21 may be used also as electrodes for image display (common electrodes), and the display/write operation (first operation) and the touch detection operation (second operation) may be performed in a time division manner. According to such a configuration, it is possible to realize slimness of the display device DSP.

Furthermore, in the present embodiment, when the position of the input device 3 (conductive materials 31a and 31b) is detected but the touch position (position of another object such as a user's finger) is not detected from the input device outer area 2c, the baseline corresponding to the input device outer area 2c is updated using the detection line corresponding to the input device outer area 2c.

Further, in the present embodiment, when the position of the input device 3 is detected, the detection line (third detection value) corresponding to the input device area 2b may be acquired without operating the magnetic field generation source 6, and the baseline corresponding to the input device area 2b may be updated based on the detection line.

Furthermore, in the present embodiment, regardless of whether the position of the input device 3 is detected or not, the detection line corresponding to the touch detection area 2a may be further acquired without operating the magnetic field generation source 6 (third detection value in each of the plurality of drive electrodes 21 may be further acquired by applying a voltage to each of the plurality of drive electrodes 21 included in the touch panel 2), and the baseline may be updated based on the detection line.

In the present embodiment, with the configuration in which the process described above is executed, for example, even in a case where the detection value in each drive electrode 21 changes according to a change in environment or the like, the touch detection operation with high accuracy can be performed using an appropriate baseline.

Second Embodiment

Next, a second embodiment will be described. Although the sensor device including the self-capacitive type touch panel has been described in the first embodiment described above, the present embodiment is different from the first embodiment in that a sensor device includes a touch panel that performs mutual capacitive type touch detection (hereinafter, referred to as a mutual-capacitive touch panel).

The appearance of the sensor device according to the present embodiment is similar to that of the first embodiment described above, and thus a detailed description thereof will be omitted here.

FIG. 27 illustrates an example of a configuration of a sensor device 1 according to the present embodiment. In FIG. 27, the same reference signs are assigned to the same portions as those in FIG. 2 referred to above, and a detailed description thereof will be omitted. Here, portions different from those in FIG. 2 will be mainly described.

As illustrated in FIG. 27, the sensor device 1 includes a touch panel 2, an input device 3, a display controller (display driver) 4a, and a touch controller (touch driver) 4b.

The touch panel 2 is a mutual-capacitive type touch panel, and includes a plurality of drive electrodes Tx and a plurality of detection electrodes Rx. The plurality of drive electrodes Tx are arranged spaced apart from each other unidirectionally. On the other hand, the plurality of detection electrodes Rx are arranged spaced apart from each other so as to intersect with the drive electrodes Tx. In the example illustrated in FIG. 27, the plurality of drive electrodes Tx extend in, for example, a second direction Y, and are arranged side-by-side in a first direction X. On the other hand, the plurality of detection electrodes Rx extend in, for example, the first direction X, and are arranged side-by-side in the second direction Y. In such a touch panel 2, an area where each of the plurality of drive electrodes Tx and each of the plurality of detection electrodes Rx intersect corresponds to a touch detection area 2a.

The plurality of drive electrodes Tx are also used as, for example, electrodes for image display (common electrodes), and are connected to the display controller 4a via wiring. The plurality of detection electrodes Rx are connected to the touch controller 4b via wiring.

The input device 3 is disposed on the touch panel 2. The input device 3 may be at least one of input devices 3a to 3d illustrated in FIG. 1 referred to above. In the following description, a case where the input device 3 is the input device 3a will be mainly described.

The display controller 4a and the touch controller 4b correspond to a sensor controller that controls the touch panel 2. The display controller 4a applies a predetermined voltage (drive signal COM) to each of the plurality of drive electrodes Tx. As a result, each of the plurality of drive electrodes Tx generates capacitance (mutual-electrostatic capacitance) with the detection electrode Rx disposed at a position intersecting with the drive electrode Tx. The touch controller 4b acquires a detection value in the detection electrode Rx, and detects an operation of a user on the input device 3. Furthermore, the touch controller 4b can also detect, for example, contact or proximity of a user's finger (that is, an operation of the user with the finger) with respect to an input device outer area 2c. The detection result by the touch controller 4b is output to, for example, an external host device 10 or the like. In the host device 10, processing according to the detection result (operation of the user) is executed.

The display controller 4a is connected to a plurality of pixels disposed in a display area of a display device on which the touch panel 2 is mounted, a gate drive circuit 5, and the like, and displays an image in the display area.

FIG. 28 illustrates an example of a cross-sectional structure of a display device DSP on which the sensor device 1 is mounted. In FIG. 28, the same reference signs are assigned to the same portions as those in FIG. 3 referred to above, and a detailed description thereof will be omitted. Here, portions different from those in FIG. 3 will be mainly described.

Although the first substrate SUB1 includes the plurality of drive electrodes 21 in the first embodiment described above, in the present embodiment, a first substrate SUB1 includes the plurality of drive electrodes (common electrodes) Tx, and a second substrate SUB2 includes the detection electrodes Rx.

Although not illustrated in FIG. 28, the display controller 4a described above is disposed on, for example, the first substrate SUB1, and the touch controller 4b is disposed on, for example, a flexible printed circuit connected to the second substrate SUB2.

Although FIG. 28 illustrates an in-cell display device DSP in which the touch panel 2 is built in a display panel PNL, the display device DSP may be an out-cell type or an on-cell type in which the touch panel 2 is provided so as to overlap the display panel PNL.

Here, the configuration of the input device 3 disposed on the touch panel 2 in the present embodiment is as described in the first embodiment described above. That is, a resonant circuit (LC circuit) including conductive materials 31a and 31b, an inductor L, and a capacitor C is provided inside the input device 3. Description of the circuit configuration of the resonant circuit is omitted here.

A basic principle of a touch detection operation using the resonant circuit provided inside the input device 3 will be described below with reference to FIG. 29. In FIG. 29, the same reference signs are assigned to the same portions as those in FIG. 7 referred to above, and a detailed description thereof will be omitted.

In the present embodiment, the mutual-capacitive type touch detection (operation) is performed, and thus the drive electrode Tx is connected to a predetermined voltage Vdd via a switch 24 as illustrated in FIG. 29. The detection electrode Rx is connected to a detector 25 via a switch 26. The detection electrode Rx is connected to the detector 25 when the switch 26 is in an on state, and is connected to GND when the switch 26 is in an off state.

In FIG. 29, the operation of the resonant circuit when a voltage is applied to the drive electrode Tx disposed at a position facing the conductive material 31b will be described, and the voltage of the drive electrode Tx disposed at a position facing the conductive material 31b (capacitive coupling unit) is V3.

In the present embodiment, each of the plurality of drive electrodes Tx is sequentially driven. For this reason, when a voltage is applied to the drive electrode Tx disposed at a position facing the conductive material 31a, the conductive material 31a is connected to GND.

Figure 30:
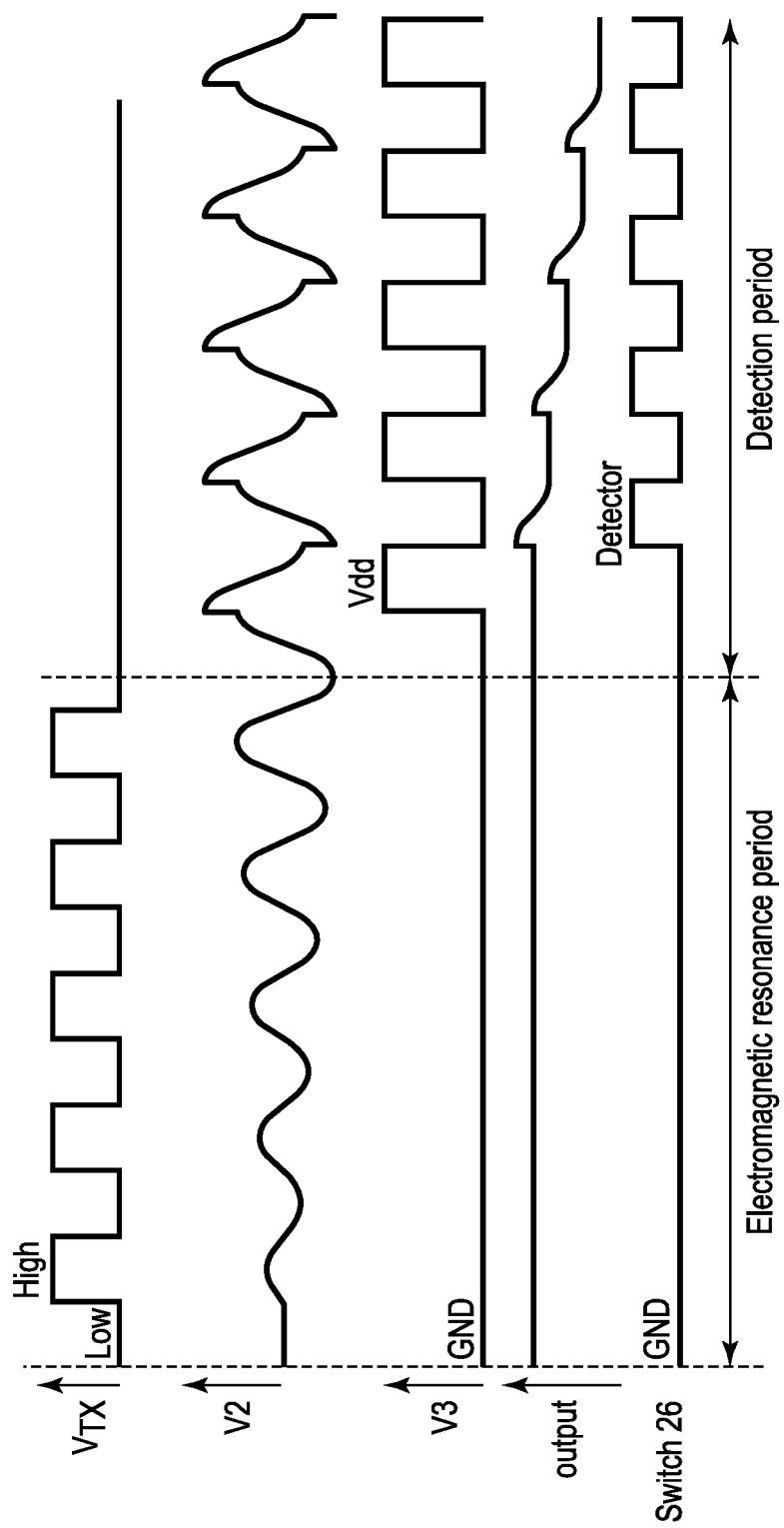
FIG. 30 is a diagram illustrating an example of a relationship among each voltage at the time of the touch detection operation, a detection value output from a detector, and a state of a switch.

Here, FIG. 30 illustrates an example of a relationship among voltages $V_{MF}$, V2, and V3, a detection value (output) output from the detector 25, and the state of the switch 26 (SW) in the touch detection operation described above.

In the present embodiment, as in the first embodiment described above, an electromagnetic resonance period in which the voltage $V_{MF}$ is applied (that is, the magnetic field generation source 6 generates a magnetic field) in the magnetic field generation source 6 and a detection period for touch detection are provided. Since the electromagnetic resonance period is similar to that of the first embodiment described above, and thus a detailed description thereof will be omitted here.

In addition, in the detection period, when the switch 24 is switched to Vdd when V2 becomes maximum, the electric potential of V2 increases, but the resonant circuit continues the resonance generated in the electromagnetic resonance period. For this reason, the electric potential of V2 decreases.

Next, when the switch 24 is switched to GND when V2 becomes minimum, current flows from the detector 25 side to the input device 3 and Tx, and the electric potential of output increases. Since the resonant circuit continues to resonate, as the electric potential of V2 increases, current flows from the input device 3 side to the detector 25 side, and the electric potential of output decreases.

In the detection period, such an operation is repeated, so that a detection value (output) as illustrated in FIG. 30 can be obtained.

Here, the detection value in the drive electrode Tx disposed at the position facing the conductive material 31b has been described, but the same applies to the detection value in the drive electrode Tx disposed at the position facing the conductive material 31a.

In addition, as described in the first embodiment described above, the electromagnetic resonance period and the detection period may overlap.

Figure 31:
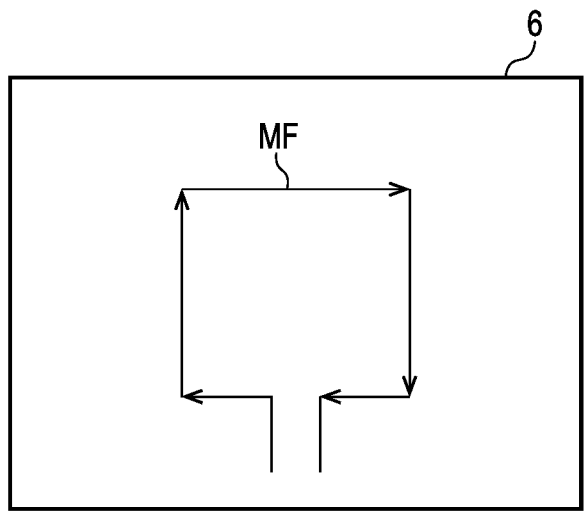
FIG. 31 is a diagram schematically illustrating an example of a magnetic field generated by a magnetic field generation source.
Figure 32:
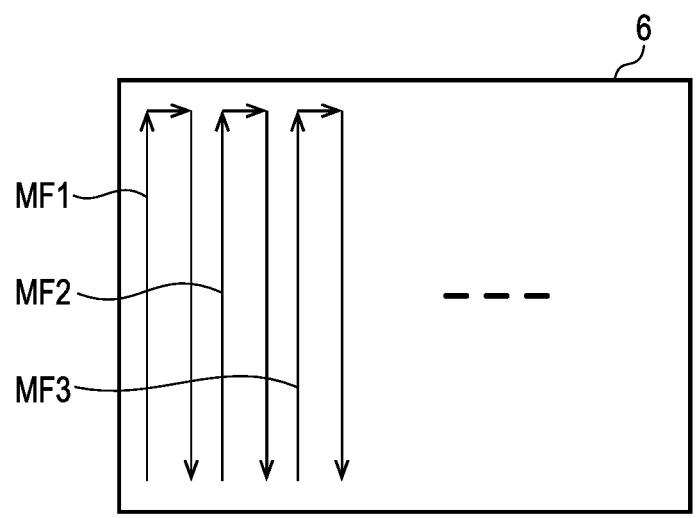
FIG. 32 is a diagram schematically illustrating another example of the magnetic field generated by the magnetic field generation source.

Here, FIGS. 31 and 32 schematically illustrate a magnetic field generated by the magnetic field generation source 6. In the present embodiment, FIG. 31 illustrates that the magnetic field generation source 6 uniformly generates a magnetic field MF, for example. On the other hand, FIG. 32 illustrates that the magnetic field generation source 6 sequentially generates magnetic fields MF1, MF2, MF3, . . . so as to scan the plurality of drive electrodes Tx included in the touch panel 2.

Hereinafter, an operation timing of the magnetic field generation source 6 (that is, a generation timing of a magnetic field by the magnetic field generation source 6) will be briefly described with reference to FIGS. 33 and 34.

Figure 33:
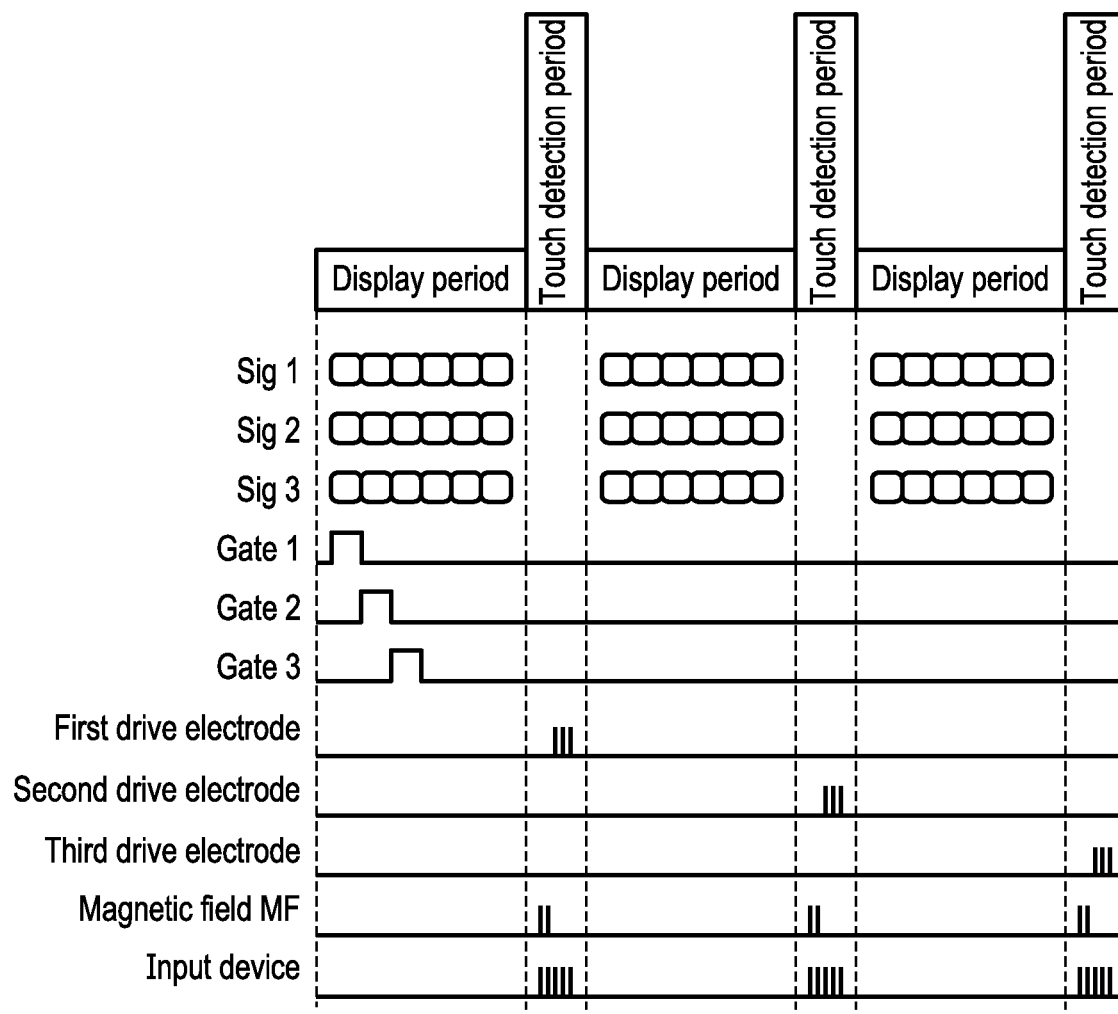
FIG. 33 is a diagram for explaining an example of an operation timing of the magnetic field generation source.

In a case where the magnetic field generation source 6 operates to generate the magnetic field MF illustrated in FIG. 31, the magnetic field generation source 6 may uniformly generate the magnetic field MF, for example, when the first to third drive electrodes Tx are sequentially driven in the touch detection period as illustrated in FIG. 33.

Figure 34:
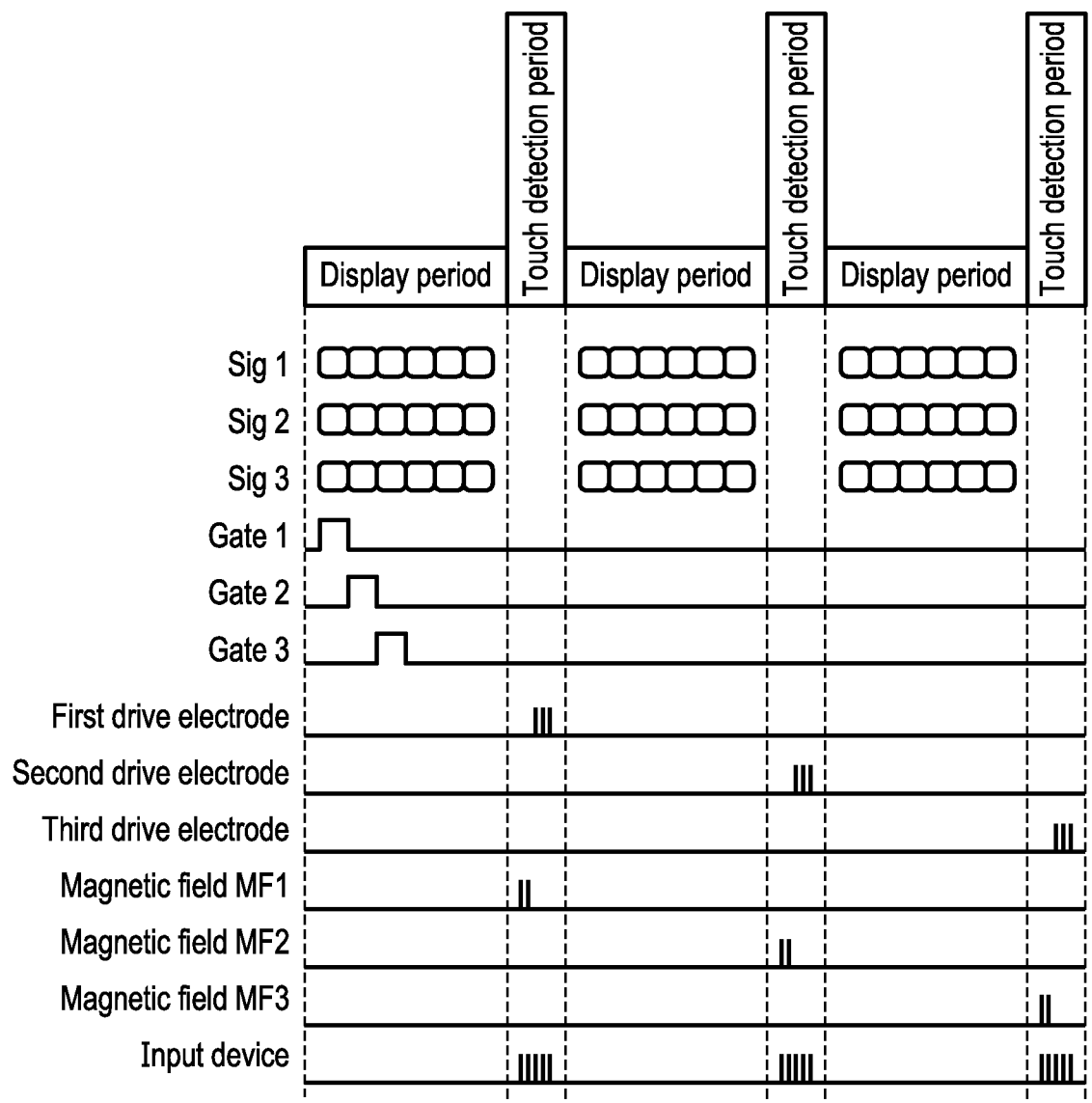
FIG. 34 is a diagram for explaining another example of the operation timing of the magnetic field generation source.

On the other hand, in a case where the magnetic field generation source 6 operates to generate the magnetic fields MF1, MF2, MF3 . . . illustrated in FIG. 32, as illustrated in FIG. 34, the magnetic field generation source 6 generates the magnetic field MF1 when the first drive electrode Tx is driven, generates the magnetic field MF2 when the second drive electrode Tx is driven, and generates the magnetic field MF3 when the third drive electrode Tx is driven, for example, in the touch detection period.

In the present embodiment, the magnetic field generation source 6 may operate to generate the magnetic field MF as illustrated in FIG. 31, or may operate to sequentially generate the magnetic fields MF1, MF2, MF3, . . . as illustrated in FIG. 32.

In the first embodiment described above, it is assumed that the magnetic field generation source 6 uniformly generates a magnetic field, but the magnetic field generation source 6 may generate the magnetic fields as illustrated in FIG. 32.

The operation of the sensor device 1 (touch panel 2) when detecting the operation of the user in the present embodiment is as described in the first embodiment described above, and thus a detailed description thereof will be omitted here. A process executed by the sensor controller 4 in the first embodiment described above is executed by the display controller 4a and the touch controller 4b in the present embodiment. Specifically, a process of driving each of the plurality of drive electrodes Tx by operating the magnetic field generation source 6, a process of driving each of the plurality of drive electrodes Tx without operating the magnetic field generation source 6, and a display/write operation are executed by the display controller 4a, and other processes are executed by the touch controller 4b.

As described above, in the present embodiment, even in a case where the sensor device 1 includes the mutual-capacitive type touch panel 2, by providing the resonant circuit including the conductive materials 31a and 31b inside the input device 3, it is possible to detect the operation of the user on the input device 3 disposed on the touch panel 2 with high accuracy, as in the first embodiment described above.

Here, the sensor device 1 according to the present embodiment includes the mutual-capacitive type touch panel 2, and depending on the operation of the user on the input device 3, the conductive materials 31a and 31b included in the input device 3 may be disposed to face (overlap) the same detection electrode Rx as illustrated in FIG. 35.

In this case, no potential is generated in the detection electrode Rx canceled by resonance of the two conductive materials 31a and 31b in opposite phases, and thus, an electric potential change due to the resonance cannot be acquired as a detection value. For this reason, the position of the input device 3 (conductive materials 31a and 31b)

cannot be detected. As described in the first embodiment described above, since the position of the input device 3 can be detected even if the electric potentials of the two conductive materials 31a and 31b are the same, for example, the conductive materials 31a and 31b may face the same drive electrode Tx.

That is, in the present embodiment, when the conductive materials 31a and 31b face the same detection electrode Rx as described above, there is a possibility that the position of the input device 3 cannot be detected.

For this reason, in the present embodiment, the input device 3 is configured such that the detection electrode Rx (second electrode) facing the conductive material 31a (first conductive material) and the detection electrode Rx facing the conductive material 31b (second conductive material) are different when the input device 3 is disposed on the touch panel 2 or when the input device 3 disposed on the touch panel 2 is operated.

Here, FIG. 36 illustrates an example of a planar structure of the input device 3 (input device 3a) in which a non-conductive material 32 is configured in a knob shape. FIG. 36 illustrates an example in which the conductive material 31b is formed in a C shape inside the non-conductive material 32, for example.

Figure 37:
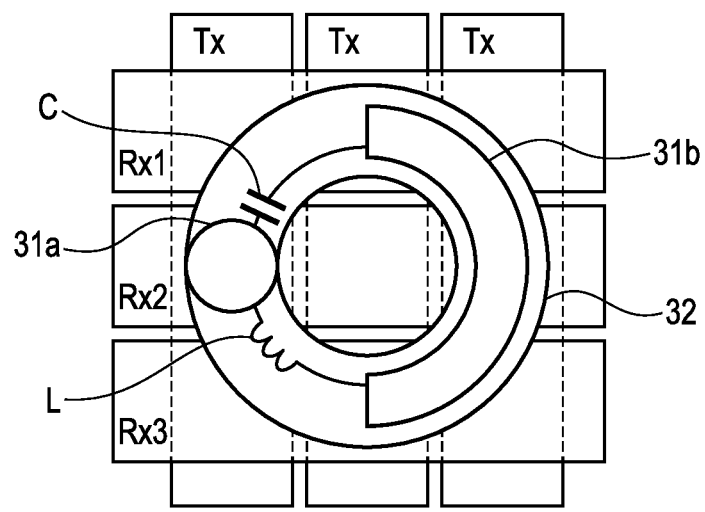
FIG. 37 is a diagram for explaining a positional relationship between conductive materials and detection electrodes provided in the input device.

According to such an input device 3, as illustrated in FIG. 37, the detection electrode Rx facing the conductive material 31a and the detection electrode Rx facing the conductive material 31b can be made different from each other. In this case, a situation in which the position of the input device 3 (conductive materials 31a and 31b) cannot be detected as described with reference to FIG. 35 referred to above can be avoided.

The input device 3 (conductive materials 31a and 31b) illustrated in FIG. 36 is an example, and the shapes and sizes of the conductive materials 31a and 31b may be different from those illustrated in FIG. 36 as long as the conductive materials 31a and 31b are formed such that a state in which the detection electrodes Rx facing the conductive materials 31a and 31b match with each other cannot occur.

In a case where the input device 3 is a button (input device 3c), for example, if the conductive materials 31a and 31b are formed as illustrated in FIG. 24 referred to above, the situation that the positions of the conductive materials 31a and 31b cannot be detected can be avoided.

Similarly, in a case where the input device 3 is a slider (input device 3d), for example, if the conductive materials 31a and 31b are formed as illustrated in FIG. 25 referred to above, the situation that the positions of the conductive materials 31a and 31b cannot be detected can be avoided.

As described above, according to each embodiment, it is possible to provide a sensor device capable of detecting an operation of a user with high accuracy.

The following are additional examples of the embodiments of the present invention.

[1]

A sensor device including:

a touch panel including a plurality of electrodes;

an input device configured such that a resonant circuit including a first conductive material and a second conductive material is covered with a non-conductive material;

a magnetic field generation source disposed at a position overlapping the touch panel and configured to generate a magnetic field; and a sensor controller configured to control the touch panel, wherein each of the first conductive material and the second conductive material is capacitively coupled to at least one of the plurality of electrodes included in the touch panel, the resonant circuit is electromagnetically coupled to the magnetic field generation source so as to resonate based on a magnetic field generated by the magnetic field generation source, and the sensor controller is configured to detect positions of the first conductive material and the second conductive material on the touch panel by applying a voltage to each of the plurality of electrodes included in the touch panel according to an operation of the magnetic field generation source.

[2]

The sensor device of item [1], wherein the plurality of electrodes include a first electrode facing the first conductive material and a second electrode facing the second conductive material when the input device is disposed on the touch panel or when the input device disposed on the touch panel is operated, and the sensor controller is configured to detect a position of the first conductive material by applying a voltage to the first electrode, and detect a position of the second conductive material by applying a voltage to the second electrode.

[3]

The sensor device of item [1], wherein the resonant circuit is a circuit in which an inductor and a capacitor are connected in parallel between the first conductive material and the second conductive material.

[4]

The sensor device of item [1], wherein the input device is configured as a knob that is rotatable about a rotation axis, each of the first conductive material and the second conductive material is held by the knob and disposed on a part of a circumference around the rotation axis, and the sensor controller is configured to detect positions of the first conductive material and the second conductive material when the knob disposed on the touch panel is rotated.

[5]

The sensor device of item [1], wherein the input device is configured as a button capable of switching between a pressed first state and an unpressed second state, the first conductive material and the second conductive material are disposed in the input device so as to be capacitively coupled to at least one of the plurality of electrodes included in the touch panel in the first state and so as not to be capacitively coupled to the plurality of electrodes included in the touch panel in the second state, and the sensor controller is configured to detect positions of the first conductive material and the second conductive material when the input device is in the first state.

[6]

The sensor device of item [1], wherein the input device is configured as a slider including a first member formed to be elongated at least unidirectionally and a second member formed to be slidable along the first member, the first conductive material is disposed inside the first member, the second conductive material is disposed inside the second member, and the sensor controller is configured to detect positions of the first conductive material and the second conductive material when the second member is slid with respect to the first member.

[7]
The sensor device of item [1], wherein the sensor controller is configured to detect positions of the first conductive material and the second conductive material based on self-electrostatic capacitance of each of the plurality of electrodes included in the touch panel.

[8]
The sensor device of item [1],
wherein the plurality of electrodes included in the touch panel include a plurality of first electrodes arranged side-by-side in a second direction intersecting with a first direction so as to extend in the first direction, and a plurality of second electrodes arranged side-by-side in the first direction so as to extend in the second direction, and
the sensor controller is configured to detect positions of the first conductive material and the second conductive material based on mutual-electrostatic capacitance between the plurality of first electrodes and the plurality of second electrodes.

[9]
The sensor device of item [8],
wherein the first conductive material and the second conductive material face at least one of the plurality of first electrodes when the input device is disposed on the touch panel or when the input device disposed on the touch panel is operated,
the first conductive material and the second conductive material face at least one of the plurality of second electrodes when the input device is disposed on the touch panel or when the input device disposed on the touch panel is operated, and
a second electrode facing the first conductive material and a second electrode facing the second conductive material are different.

[10]
The sensor device of item [1],
wherein the sensor controller is configured to
acquire a first detection value in each of the plurality of electrodes included in the touch panel by applying a voltage to each of the plurality of electrodes without operating the magnetic field generation source when power of the touch panel is turned on,
acquire a second detection value in each of the plurality of electrodes included in the touch panel by operating the magnetic field generation source to apply a voltage to each of the plurality of electrodes, and
detect positions of the first conductive material and the second conductive material by comparing the first detection value with the second detection value.

[11]
The sensor device of item [10],
wherein the touch panel is mounted on a display device, and
the sensor controller is configured to perform a first operation of displaying an image on the display device and a second operation of detecting positions of the first conductive material, the second conductive material, and another object on the touch panel in a time division manner.

[12]
The sensor device of item [11],
wherein the sensor controller is configured to
update the first detection value acquired by applying a voltage to an electrode corresponding to a second area other than a first area in which the input device is disposed based on the second detection value acquired by applying a voltage to an electrode corresponding to the second area when positions of the first conductive material and the second conductive material are detected and a position of the another object is not detected from the second area, and
further detect positions of the first conductive material and the second conductive material using the updated first detection value.

[13]
The sensor device of item [12],
wherein the sensor controller is configured to
further acquire a third detection value in each of the plurality of electrodes by applying a voltage to the electrode corresponding to the first area without operating the magnetic field generation source when positions of the first conductive material and the second conductive material are detected,
update the first detection value acquired by applying a voltage to the electrode corresponding to the first area based on the third detection value, and
further detect positions of the first conductive material and the second conductive material using the updated first detection value.

[14]
The sensor device of item [10],
wherein the sensor controller is configured to
further acquire a third detection value in each of the plurality of electrodes by operating the magnetic field generation source to apply a voltage to each of the plurality of electrodes included in the touch panel,
update the first detection value based on the third detection value, and
further detect positions of the first conductive material and the second conductive material using the updated first detection value.

[15]
An input device disposed on a touch panel including a plurality of electrodes and used, the input device including:
a first conductive material;
a second conductive material;
a resonant circuit including the first conductive material and the second conductive material; and
a non-conductive material formed so as to cover the resonant circuit,
wherein each of the first conductive material and the second conductive material is capacitively coupled to at least one of the plurality of electrodes included in the touch panel,
the resonant circuit is electromagnetically coupled to a magnetic field generation source disposed at a position overlapping the touch panel so as to resonate based on a magnetic field generated by the magnetic field generation source, and
positions of the first conductive material and the second conductive material on the touch panel are detected by applying a voltage to each of the plurality of electrodes included in the touch panel according to an operation of the magnetic field generation source.

[16]
A method executed by a sensor device including a touch panel including a plurality of electrodes, an input device configured such that a resonant circuit including a first conductive material and a second conductive material is covered with a non-conductive material, a magnetic field generation source disposed at a position overlapping the touch panel and configured to generate a magnetic field, and a sensor controller configured to control the touch panel, the method including:

capacitively coupling each of the first conductive material and the second conductive material to at least one of the plurality of electrodes included in the touch panel;

electromagnetically coupling the resonant circuit to the magnetic field generation source so as to resonate based on a magnetic field generated by the magnetic field generation source;

applying a voltage to each of the plurality of electrodes included in the touch panel according to an operation of the magnetic field generation source; and detecting positions of the first conductive material and the second conductive material on the touch panel.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sensor device comprising:
   a touch panel including a plurality of electrodes;
   an input device configured such that a resonant circuit including a first conductive material and a second conductive material is covered with a non-conductive material;
   a magnetic field generation source disposed at a position overlapping the touch panel and configured to generate a magnetic field; and
   a sensor controller configured to control the touch panel,
   wherein each of the first conductive material and the second conductive material is capacitively coupled to at least one of the plurality of electrodes included in the touch panel,
   the resonant circuit is electromagnetically coupled to the magnetic field generation source so as to resonate based on a magnetic field generated by the magnetic field generation source, and
   the sensor controller is configured to detect positions of the first conductive material and the second conductive material on the touch panel by applying a voltage to each of the plurality of electrodes included in the touch panel according to an operation of the magnetic field generation source.

2. The sensor device according to claim 1,
   wherein the plurality of electrodes include a first electrode facing the first conductive material and a second electrode facing the second conductive material when the input device is disposed on the touch panel or when the input device disposed on the touch panel is operated, and
   the sensor controller is configured to detect a position of the first conductive material by applying a voltage to the first electrode, and detect a position of the second conductive material by applying a voltage to the second electrode.

3. The sensor device according to claim 1, wherein the resonant circuit is a circuit in which an inductor and a capacitor are connected in parallel between the first conductive material and the second conductive material.

4. The sensor device according to claim 1,
   wherein the input device is configured as a knob that is rotatable about a rotation axis,
   each of the first conductive material and the second conductive material is held by the knob and disposed on a part of a circumference around the rotation axis, and
   the sensor controller is configured to detect positions of the first conductive material and the second conductive material when the knob disposed on the touch panel is rotated.

5. The sensor device according to claim 1,
   wherein the input device is configured as a button capable of switching between a pressed first state and an unpressed second state,
   the first conductive material and the second conductive material are disposed in the input device so as to be capacitively coupled to at least one of the plurality of electrodes included in the touch panel in the first state and so as not to be capacitively coupled to the plurality of electrodes included in the touch panel in the second state, and
   the sensor controller is configured to detect positions of the first conductive material and the second conductive material when the input device is in the first state.

6. The sensor device according to claim 1,
   wherein the input device is configured as a slider including a first member formed to be elongated at least unidirectionally and a second member formed to be slidable along the first member,
   the first conductive material is disposed inside the first member,
   the second conductive material is disposed inside the second member, and
   the sensor controller is configured to detect positions of the first conductive material and the second conductive material when the second member is slid with respect to the first member.

7. The sensor device according to claim 1, wherein the sensor controller is configured to detect positions of the first conductive material and the second conductive material based on self-electrostatic capacitance of each of the plurality of electrodes included in the touch panel.

8. The sensor device according to claim 1,
   wherein the plurality of electrodes included in the touch panel include a plurality of first electrodes arranged side-by-side in a second direction intersecting with a first direction so as to extend in the first direction, and a plurality of second electrodes arranged side-by-side in the first direction so as to extend in the second direction, and
   the sensor controller is configured to detect positions of the first conductive material and the second conductive material based on mutual-electrostatic capacitance between the plurality of first electrodes and the plurality of second electrodes.

9. The sensor device according to claim 8,
   wherein the first conductive material and the second conductive material face at least one of the plurality of first electrodes when the input device is disposed on the touch panel or when the input device disposed on the touch panel is operated,
   the first conductive material and the second conductive material face at least one of the plurality of second electrodes when the input device is disposed on the touch panel or when the input device disposed on the touch panel is operated, and a second electrode facing the first conductive material and a second electrode facing the second conductive material are different.

10. The sensor device according to claim 1,
wherein the sensor controller is configured to
acquire a first detection value in each of the plurality of electrodes included in the touch panel by applying a voltage to each of the plurality of electrodes without operating the magnetic field generation source when power of the touch panel is turned on,
acquire a second detection value in each of the plurality of electrodes included in the touch panel by operating the magnetic field generation source to apply a voltage to each of the plurality of electrodes, and
detect positions of the first conductive material and the second conductive material by comparing the first detection value with the second detection value.

11. The sensor device according to claim 10,
wherein the touch panel is mounted on a display device, and
the sensor controller is configured to perform a first operation of displaying an image on the display device and a second operation of detecting positions of the first conductive material, the second conductive material, and another object on the touch panel in a time division manner.

12. The sensor device according to claim 11,
wherein the sensor controller is configured to
update the first detection value acquired by applying a voltage to an electrode corresponding to a second area other than a first area in which the input device is disposed based on the second detection value acquired by applying a voltage to an electrode corresponding to the second area when positions of the first conductive material and the second conductive material are detected and a position of the another object is not detected from the second area, and
further detect positions of the first conductive material and the second conductive material using the updated first detection value.

13. The sensor device according to claim 12,
wherein the sensor controller is configured to
further acquire a third detection value in each of the plurality of electrodes by applying a voltage to the electrode corresponding to the first area without operating the magnetic field generation source when positions of the first conductive material and the second conductive material are detected,
update the first detection value acquired by applying a voltage to the electrode corresponding to the first area based on the third detection value, and
further detect positions of the first conductive material and the second conductive material using the updated first detection value.

14. The sensor device according to claim 10,
wherein the sensor controller is configured to
further acquire a third detection value in each of the plurality of electrodes by operating the magnetic field generation source to apply a voltage to each of the plurality of electrodes included in the touch panel,
update the first detection value based on the third detection value, and
further detect positions of the first conductive material and the second conductive material using the updated first detection value.

15. An input device disposed on a touch panel including a plurality of electrodes and used, the input device comprising:
a first conductive material;
a second conductive material;
a resonant circuit including the first conductive material and the second conductive material; and
a non-conductive material formed so as to cover the resonant circuit,
wherein each of the first conductive material and the second conductive material is capacitively coupled to at least one of the plurality of electrodes included in the touch panel,
the resonant circuit is electromagnetically coupled to a magnetic field generation source disposed at a position overlapping the touch panel so as to resonate based on a magnetic field generated by the magnetic field generation source, and
positions of the first conductive material and the second conductive material on the touch panel are detected by applying a voltage to each of the plurality of electrodes included in the touch panel according to an operation of the magnetic field generation source.

16. A method executed by a sensor device including a touch panel including a plurality of electrodes, an input device configured such that a resonant circuit including a first conductive material and a second conductive material is covered with a non-conductive material, a magnetic field generation source disposed at a position overlapping the touch panel and configured to generate a magnetic field, and a sensor controller configured to control the touch panel, the method comprising:
capacitively coupling each of the first conductive material and the second conductive material to at least one of the plurality of electrodes included in the touch panel;
electromagnetically coupling the resonant circuit to the magnetic field generation source so as to resonate based on a magnetic field generated by the magnetic field generation source;
applying a voltage to each of the plurality of electrodes included in the touch panel according to an operation of the magnetic field generation source; and
detecting positions of the first conductive material and the second conductive material on the touch panel.

* * * * *